United States Patent
Si et al.

(10) Patent No.: US 12,302,331 B2
(45) Date of Patent: May 13, 2025

(54) UCI MULTIPLEXING TRANSMISSION METHOD AND APPARATUS, AND STORAGE MEDIUM

(71) Applicant: DATANG MOBILE COMMUNICATIONS EQUIPMENT CO., LTD., Beijing (CN)

(72) Inventors: Qianqian Si, Beijing (CN); Xuejuan Gao, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 0 days.

(21) Appl. No.: 18/262,007

(22) PCT Filed: Jan. 7, 2022

(86) PCT No.: PCT/CN2022/070758
§ 371 (c)(1),
(2) Date: Jul. 18, 2023

(87) PCT Pub. No.: WO2022/156548
PCT Pub. Date: Jul. 28, 2022

(65) Prior Publication Data
US 2024/0064743 A1    Feb. 22, 2024

(30) Foreign Application Priority Data
Jan. 19, 2021  (CN) .......................... 202110070189.1

(51) Int. Cl.
*H04W 72/21* (2023.01)
*H04W 72/1268* (2023.01)

(52) U.S. Cl.
CPC ....... *H04W 72/21* (2023.01); *H04W 72/1268* (2013.01)

(58) Field of Classification Search
CPC . H04W 72/02; H04W 72/04; H04W 72/0446; H04W 72/121; H04W 72/23;
(Continued)

(56) References Cited

U.S. PATENT DOCUMENTS 12,016,031 B2    6/2024   Kang et al.
2023/0354324 A1* 11/2023  Wu .................. H04W 72/1268

FOREIGN PATENT DOCUMENTS

| CA | 3046451 A1 | 6/2018 |
| CN | 110063039 A | 7/2019 |

(Continued)

OTHER PUBLICATIONS

Ericsson, "Views on WI for NR coverage enhancement", 3GPP TSG RAN Meeting #90-e, Electronic Meeting, Dec. 7-11, 2020, total 10 pages, RP-202410.
(Continued)

*Primary Examiner* — Bo Hui A Zhu
(74) *Attorney, Agent, or Firm* — Kilpatrick Townsend & Stockton LLP

(57) ABSTRACT

Provided in the embodiments of the present disclosure are a UCI multiplexing method and apparatus, and a storage medium. With regard to a PUSCH carrying a multi-slot TB, when the PUSCH and one PUCCH overlap in at least one slot, the UCI multiplexing method comprises: determining resources needing to be occupied during the multiplexing of UCI on the PUSCH and an upper limit of the resources occupied during the multiplexing of the UCI on the PUSCH; on the basis of the resources needing to be occupied during the multiplexing of the UCI on the PUSCH and the upper limit of the resources occupied during the multiplexing of the UCI on the PUSCH, determining resources occupied during the actual transmission of the UCI; and on the basis of the resources occupied during the actual transmission of
(Continued)

the UCI, transmitting the UCI on the PUSCH. By means of the embodiments of the present disclosure, the multiplexing of UCI on a PUSCH carrying a multi-slot TB is realized.

20 Claims, 5 Drawing Sheets

(58) Field of Classification Search
CPC ..... H04W 72/50; H04W 72/51; H04W 72/52; H04W 72/53; H04W 72/54; H04W 72/541; H04W 72/542; H04W 72/543; H04W 72/56
See application file for complete search history.

(56) References Cited

FOREIGN PATENT DOCUMENTS

| CN | 110944387 | A  | 3/2020  |
|----|-----------|----|---------|
| CN | 111835480 | A  | 10/2020 |
| WO | 2020006678 | A1 | 1/2020  |
| WO | 2020080915 | A1 | 4/2020  |

OTHER PUBLICATIONS

OPPO, "Supporting TB over multi-slot PUSCH", 3GPP TSG RAN WG1 #103-e, e-Meeting, Jan. 25-Feb. 5, 2021, total 4 pages, R1-2100173.

European Patent Office, Extended European Search Report Issued in Application No. 22742027.0, Oct. 8, 2024, Germany, 17 pages.

Vivo, "Discussion on PUSCH TB processing over multiple slots", 3GPP TSG RAN WG1 #104-e, e-Meeting, Jan. 25-Feb. 5, 2021, total 7 pages, R1-2100458.

Huawei et al., "PUSCH enhancements for URLLC", 3GPP TSG RAN WG1 Meeting #98bis, Chongqing, China, Oct. 14-20, 2019, total 13 pages, R1-1910068.

CAICT, "PUSCH enhancements for URLLC", 3GPP TSG RAN WG1 Meeting #99, Reno, USA, Nov. 18-22, 2019, total 9 pages, R1-1913031.

Japanese Patent Office, Office Action Issued in Application No. 2023-543441, Jul. 1, 2024, 3 pages.

CATT, "Remaining issues on PUSCH enhancements", 3GPP TSG RAN WG1 #100bis, e-Meeting, Apr. 10-30, 2020, total 19 pages, R1-2002084.

Huawei et al., "Corrections on PUSCH enhancement", 3GPP TSG RAN WG1 Meeting #100-e, Feb. 24-Mar. 6, 2020, total 9 pages, R1-2001028.

\* cited by examiner

UCI MULTIPLEXING TRANSMISSION METHOD AND APPARATUS, AND STORAGE MEDIUM

CROSS-REFERENCE TO RELATED APPLICATION

The present application claims priority to Chinese patent application No. 2021100701891 filed on Jan. 19, 2021, entitled "UCI Multiplexing Transmission Method and Apparatus, and Storage Medium", which is hereby incorporated by reference in its entirety.

FIELD

The present application relates to the field of communication, and in particular, to UCI multiplexing methods and apparatuses, and a storage medium.

BACKGROUND

In the 5th generation new radio (NR) system, a transport block (TB) of a physical uplink shared channel (PUSCH) may be supported to be transmitted over multiple slots. For such TB processing over multiple slots PUSCH (TBoMS) (referred to as multi-slot PUSCH, for simplicity), there is no an uplink control information (UCI) multiplexing method on multi-slot PUSCH.

SUMMARY

Embodiments of the present application provide uplink control information (UCI) multiplexing methods and apparatuses, and a storage medium, which solve a problem that there is no a UCI multiplexing method on multi-slot PUSCH at present.

An embodiment of the present application provides a UCI multiplexing method, where for a physical uplink shared channel (PUSCH) carrying a multi-slot transport block (TB), in case that the PUSCH and a physical uplink control channel (PUCCH) overlap in at least one slot, the UCI multiplexing method includes:
  determining resources required for UCI multiplexing on the PUSCH and an upper limit of resources used for UCI multiplexing on the PUSCH;
  determining resources used for actual UCI transmission based on the resources required for UCI multiplexing on the PUSCH and the upper limit of resources used for UCI multiplexing on the PUSCH; and
  transmitting the UCI on the PUSCH based on the resources used for the actual UCI transmission.

An embodiment of the present application provides a UCI multiplexing method, where for a physical uplink shared channel (PUSCH) carrying a multi-slot transport block (TB), in case that the PUSCH and a physical uplink control channel (PUCCH) overlap in at least one slot, the UCI multiplexing method includes:
  determining resources required for UCI multiplexing on the PUSCH and an upper limit of resources used for UCI multiplexing on the PUSCH;
  determining resources used for actual UCI transmission based on the resources required for UCI multiplexing on the PUSCH and the upper limit of resources used for UCI multiplexing on the PUSCH; and
  receiving the UCI on the PUSCH based on the resources used for the actual UCI transmission.

An embodiment of the present application provides a terminal, including:
  a processor;
  a memory storing a computer program, and
  a transceiver transmitting and receiving data under a control of the processor,
  where the computer program, when executed by the processor, causes the terminal to perform the following operations of:
  for a physical uplink shared channel (PUSCH) carrying a multi-slot transport block (TB), in case that the PUSCH and a physical uplink control channel (PUCCH) overlap in at least one slot, determining resources required for UCI multiplexing on the PUSCH and an upper limit of resources used for UCI multiplexing on the PUSCH;
  determining resources used for actual UCI transmission based on the resources required for UCI multiplexing on the PUSCH and the upper limit of resources used for UCI multiplexing on the PUSCH; and
  transmitting the UCI on the PUSCH based on the resources used for the actual UCI transmission.

An embodiment of the present application provides a network side device, including:
  a processor,
  a memory storing a computer program, and
  a transceiver transmitting and receiving data under a control of the processor,
  where the computer program, when executed by the processor, causes the network side device to perform the following operations of
  for a physical uplink shared channel (PUSCH) carrying a multi-slot transport block (TB), in case that the PUSCH and a physical uplink control channel (PUCCH) overlap in at least one slot, determining resources required for UCI multiplexing on the PUSCH and an upper limit of resources used for UCI multiplexing on the PUSCH;
  determining resources used for actual UCI transmission based on the resources required for UCI multiplexing on the PUSCH and the upper limit of resources used for UCI multiplexing on the PUSCH; and
  receiving the UCI on the PUSCH based on the resources used for the actual UCI transmission.

An embodiment of the present application provides an uplink control information (UCI) multiplexing apparatus, where for a physical uplink shared channel (PUSCH) carrying a multi-slot transport block (TB), in case that the PUSCH and a physical uplink control channel (PUCCH) overlap in at least one slot, the UCI multiplexing apparatus includes:
  a first determination module, used for determining resources required for UCI multiplexing on the PUSCH and an upper limit of resources used for UCI multiplexing on the PUSCH;
  a second determination module, used for determining resources used for actual UCI transmission based on the resources required for UCI multiplexing on the PUSCH and the upper limit of resources used for UCI multiplexing on the PUSCH; and
  a transmission module, used foe transmitting the UCI on the PUSCH based on the resources used for the actual UCI transmission.

An embodiment of the present application provides an uplink control information (UCI) multiplexing apparatus, where for a physical uplink shared channel (PUSCH) carrying a multi-slot transport block (TB), in case that the PUSCH and a physical uplink control channel (PUCCH) overlap in at least one slot, the UCI multiplexing apparatus includes:

a first determination module, used for determining resources required for UCI multiplexing on the PUSCH and an upper limit of resources used for UCI multiplexing on the PUSCH;

a second determination module, used for determining resources used for actual UCI transmission based on the resources required for UCI multiplexing on the PUSCH and the upper limit of resources used for UCI multiplexing on the PUSCH; and a reception module, used for receiving the UCI on the PUSCH based on the resources used for the actual UCI transmission.

An embodiment of the present application provides a non-transitory processor readable storage medium storing computer programs that, when executed by a processor, cause the processor to perform any one of the above methods.

In the UCI multiplexing methods and apparatuses, and the storage medium, resources required for UCI multiplexing on the PUSCH and the upper limit of resources used for UCI multiplexing on the PUSCH are determined, resources used for actual UCI transmission are determined based on the resources required for UCI multiplexing on the PUSCH and the upper limit of resources used for UCI multiplexing on the PUSCH, and the UCI is transmitted on the PUSCH based on the resources used for the actual UCI transmission. As such, for a PUSCH transmitting one TB over multiple slots, UCI multiplexing is supported on such multi-slot PUSCH, ensuring transmission performances of UCI and Multi-slot PUSCH.

BRIEF DESCRIPTION OF THE DRAWINGS

In order to clearly illustrate the solutions disclosed in the embodiments of the present application or the related art, the drawings used in the descriptions of the embodiments or the related art are briefly described below. The drawings in the following description are only certain embodiments of the present application, and other drawings may be obtained according to these drawings without creative work for those skilled in the art.

DETAILED DESCRIPTION

Figure 1:
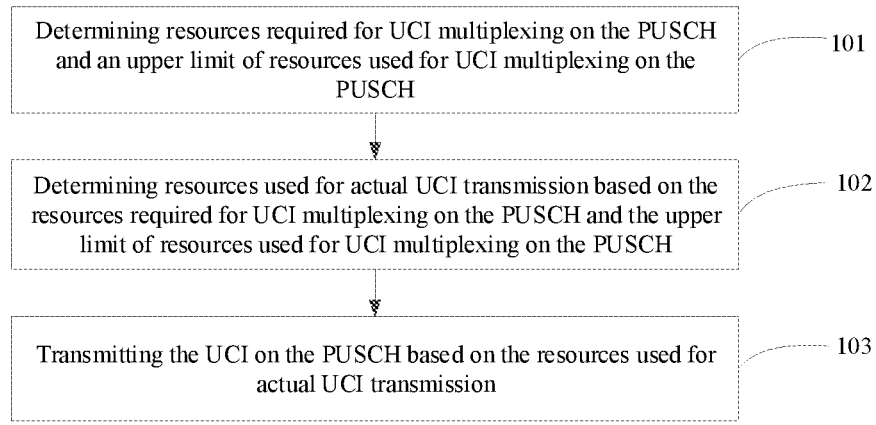
FIG. 1 is a schematic flowchart showing steps of an uplink control information (UCI) multiplexing method applied to a terminal according to an embodiment of the present application.

The solutions in the embodiments of the present application are clearly and completely described below in combination with the accompanying drawings of the embodiments of the present application. The described embodiments are a part of the embodiments of the present application, rather than all the embodiments. Based on the embodiments of the present application, all other embodiments obtained by those of ordinary skill in the art without creative work are within the scope of the protection of the present application.

At present, in a new radio (NR) communication system, for the same terminal, in order to avoid higher peak to average power ratio (PAPR), a simultaneous physical uplink control channel (PUCCH) and physical uplink shared channel (PUSCH) transmission is not supported. In case that time domain resources for PUCCH transmission and PUSCH transmission overlap, the terminal may perform multiplexing or perform selective transmission based on channel priority.

In case that resources for single slot PUCCH and PUSCH with the same physical layer priority overlap in one or more slots, for the single slot PUSCH or PUSCH repetition Type-A, the terminal multiplexes uplink control information (UCI) carried on the PUCCH in transmissions of all PUSCHs that overlap with the PUCCH; or for PUSCH repetition Type-B, the terminal multiplexes the UCI carried on the PUCCH in the first actual PUSCH that overlaps with the PUCCH and has more than one symbols.

In case that resources for multi-slot PUCCH and PUSCH with the same physical layer priority overlap, the PUSCH is dropped in a contention slot and only the multi-slot PUCCH is transmitted in the contention slot.

In case that resources for PUCCH and PUSCH with different physical layer priorities overlap in one or more slots, a channel having a lower priority is dropped and only a channel having a higher priority is transmitted.

At present, both hybrid automatic repeat request acknowledge (HARQ-ACK) and channel state information (CSI) carried on PUCCH may be transmitted through a PUSCH. In case that the number of HARQ-ACK bits is less than or equal to 2, the HARQ-ACK is transmitted by puncturing the PUSCH; or in case that the number of HARQ-ACK bits is greater than 2, the HARQ-ACK is transmitted by rate matching the PUSCH. The CSI is transmitted by rate matching the PUSCH. Both the HARQ-ACK and CSI are mapped to all layers of the transport block (TB) on the PUSCH for transmission.

The HARQ-ACK mapping starts from a first non-demodulation reference signal (DMRS) symbol after a first DMRS on PUSCH. In case that the number of HARQ-ACK bits is less than or equal to 2, a part of resources is reserved. In case that the number of HARQ-ACK bits is 0, 1 or 2, an HARQ-ACK resource is always reserved according to 2 bits. In case that an actual number of HARQ-ACK bit is 1, the HARQ-ACK is mapped to part resource of the reserved resource.

The CSI mapping starts from a first non-DMRS symbol on PUSCH. In case that the number of HARQ-ACK information bits is less than 2, a reserved resource for HARQ-ACK is on the PUSCH, and CSI part 1 is not mapped to the reserved resource, while CSI part 2 may be mapped to the reserved resource. In case that the number of HARQ-ACK information bits is greater than 2, PUSCH is rate-matched for transmission, and neither CSI part 1 nor CSI part 2 is mapped to the HARQ-ACK resource.

UCI frequency domain discrete mapping is performed within a transmission bandwidth of PUSCH in an order of frequency domain first and then time sequence. For a certain type of UCI, an interval d between modulation symbols in an orthogonal frequency division multiplexing (OFDM) symbol is determined as follows. In case that the number of remaining unmapped modulation symbols for the UCI is greater than or equal to the number of available resource elements (RE) in the OFDM symbol, d=1; otherwise, d=floor, where floor is a quotient obtained by dividing the number of available REs in the OFDM symbol by the number of remaining unmapped modulation symbols for the UCI.

However, at present, for a PUSCH transmitting one TB over multiple slots, there is no a UCI multiplexing method on the PUSCH.

Embodiments of the present application provide UCI multiplexing methods and apparatuses, and a storage medium, which may be used for UCI multiplexing on a PUSCH carrying multi-slot TB.

The methods and the apparatuses are based on the same conception. Since the principles of the methods and the apparatuses to solve the problems are similar, the implementation of the apparatuses and methods may be referred to each other, and the similar part is not repeated.

The solutions according to the embodiments of the present application may be applicable to various systems, for example, 5G systems. For example, the applicable systems may be a global system of mobile communication (GSM) system, a code division multiple access (CDMA) system, a wideband code division multiple access (WCDMA) general packet radio service (GPRS) system, a long term evolution (LTE) system, an LTE frequency division duplex (FDD) system, an LTE time division duplex (TDD) system, a long term evolution advanced (LTE-A) system, a universal mobile telecommunication system (UMTS), a worldwide interoperability for microwave access (WiMAX) system, a 5G new radio (NR) system, etc. These various systems include a terminal device and a network device, and may further include a core network part, such as an evolved packet system (EPS), a 5G system (5GS), and the like.

The terminal device in the embodiments of the present application may be a device that provides voice and/or data connectivity to a user, a handheld device with a wireless connection function, or other processing devices connected to a wireless modem. In different systems, the names of the terminal device may be different. For example, in the 5G system, the terminal device may be called as a user equipment (UE). A wireless terminal device may communicate with one or more core networks (CN) via a radio access network (RAN), and the wireless terminal device may be a mobile terminal device, such as a mobile phone (or cellular phone) and a computer with mobile terminal device, e.g., a portable mobile device, a pocket-sized mobile device, a handheld mobile device, a computer-built mobile device or a vehicle-mounted mobile device, which exchange language and/or data with the radio access network. For example, a personal communication service (PCS) phone, a radio phone, a session initiated protocol (SIP) phone, a wireless local loop (WLL) station, a personal digital assistant (PDA) and other devices. A wireless terminal device may also be called a system, a subscriber unit, a subscriber station, a mobile station, a mobile platform, a remote station, an access point, a remote terminal, an access terminal, a user terminal, a user agent, or a user device, which is not limited in the embodiments of the present application. Since the terminal device and other network devices (such as a core network device, an access network device (e.g. a base station)) together form a network supporting communication, the terminal device may be regarded as a network device in the present application.

The network device in the embodiments of the present application may be a base station, and the base station may include multiple cells providing services for the terminal. Depending on the specific scenario, the base station may be called an access point, or a device communicating with a wireless terminal device through one or more sectors on the air interface in the access network, or other names. The network device may be used for exchanging received air frames with internet protocol (IP) packets, and acting as a router between the wireless terminal device and the rest of the access network, where the rest of the access network may include an IP communication network. The network device may also coordinate attribute management for the air interface. For example, the network device in the embodiments of the present application may be a base transceiver station (BTS) in a global system for mobile communications (GSM) or a code division multiple access (CDMA), or may be a node B in a wide-band code division multiple access (WCDMA), or may be an evolutional node B (eNB or e-Node B) in a long term evolution (LTE) system, or may be a 5G gNB in 5G network architecture (next generation system), or may be a home evolved node B (HeNB), a relay node, a femto, or a pico, etc., which is not limited in the embodiments of the present application. In some network structures, the network device may include a centralized unit (CU) node and a distributed unit (DU) node, and the centralized unit and the distributed unit may be geographically separated.

In addition, it should be noted that the term "an embodiment" or "one embodiment" mentioned throughout the description means that a particular feature, structure or characteristic related to the embodiment is included in at least one embodiment of the present application. Therefore, the phrases "in an embodiment" or "in one embodiment" appearing throughout the description do not necessarily refer to the same embodiment. Furthermore, these specific features, structures or characteristics may be combined in any suitable manner in one or more embodiments.

The following is a detailed illustration for the present application.

In the present application, UCI multiplexing refers to that UCI is multiplexed on PUSCH carrying multi-slot TB.

The PUSCH carrying multi-slot TB is that one TB is encoded based on the total number of symbols corresponding to PUSCHs in multiple slots, and encoded information is scattered across the multiple slots and transmitted through the corresponding PUSCHs.

FIG. 1 is a schematic flowchart showing steps of a UCI multiplexing method applied to a terminal according to an embodiment of the present application.

For a PUSCH carrying a multi-slot TB, in case that the PUSCH and a PUCCH overlap in at least one slot, the UCI multiplexing method includes the following steps:

step 101, determining resources required for UCI multiplexing on the PUSCH and an upper limit of resources used for UCI multiplexing on the PUSCH.

In the step 101, before the UCI multiplexing, the terminal needs to first determine the resources required for UCI multiplexing on the PUSCH, and determine a maximum resource, i.e. the upper limit of resources, that may be used for UCI multiplexing on the PUSCH.

Step 102: determining resources used for actual UCI transmission based on the resources required for UCI multiplexing on the PUSCH and the upper limit of resources used for UCI multiplexing on the PUSCH.

Since the upper limit of resources used for UCI multiplexing on the PUSCH does not necessarily meet the resources required for UCI multiplexing on the PUSCH, it is necessary to determine the resources used for actual UCI transmission based on the resources required for UCI multiplexing on the PUSCH and the upper limit of resources used for UCI multiplexing on the PUSCH.

In an embodiment, in the step 102, a smaller of the resources required for UCI multiplexing on the PUSCH and the upper limit of resources used for UCI multiplexing on the PUSCH may be determined to be the resources used for actual UCI transmission, to ensure a validity of the resources used for actual UCI transmission.

Step 103: transmitting the UCI on the PUSCH based on the resources used for the actual UCI transmission.

After the resources used for actual UCI transmission are determined, the UCI may be transmitted on the PUSCH based on the resources used for the actual UCI transmission. As such, for a PUSCH transmitting one TB over multiple slots, UCI multiplexing is supported on such multi-slot PUSCH, ensuring transmission performances of UCI and multi-slot PUSCH.

In the embodiment of the present application, by determining the resources required for UCI multiplexing on the PUSCH and the upper limit of resources used for UCI multiplexing on the PUSCH, determining the resources used for actual UCI transmission based on the resources required for UCI multiplexing on the PUSCH and the upper limit of resources used for UCI multiplexing on the PUSCH, and transmitting the UCI on the PUSCH based on the resources used for the actual UCI transmission, for a PUSCH transmitting one TB over multiple slots, UCI multiplexing is supported on such multi-slot PUSCH, ensuring transmission performances of UCI and multi-slot PUSCH.

In an embodiment, the determining the resources required for UCI multiplexing on the PUSCH includes any one of the following schemes.

Scheme 1, determining the resources required for UCI multiplexing on the PUSCH based on resources for the PUSCH in one slot.

For a PUSCH transmitting one TB over multiple slots, in case that a PUCCH and the PUSCH overlap in one or more slots, the resources required for UCI multiplexing on the PUSCH may be determined based on resources for the PUSCH in one slot.

In an embodiment, the determining the resources required for UCI multiplexing on the PUSCH based on resources for the PUSCH in one slot includes: determining the resources required for UCI multiplexing on the PUSCH based on the number of OFDM symbols of the PUSCH in one slot.

In an embodiment, in case of determining the resources required for UCI multiplexing on the PUSCH based on the number of OFDM symbols of the PUSCH in one time slot, the resources required for UCI multiplexing on the PUSCH may be determined based on the following first formula or second formula.

The first formula is:

$$R = \left\lceil (O_{UCI} + L_{UCI}) \times \beta_{offset}^{PUSCH} \times \sum_{l=0}^{N_{symb,slot}^{PUSCH}-1} M_{SC}^{UCI}(l) \middle/ \sum_{r=0}^{C_{UCI-SCH}-1} K_r \right\rceil$$

The second formula is:

$$R = \left\lceil (O_{UCI} + L_{UCI}) \times \beta_{offset}^{PUSCH} \times \sum_{l=0}^{N_{symb,slot}^{PUSCH}-1} M_{SC}^{UCI}(l) \middle/ \sum_{r=0}^{C_{UCI-SCH}-1} K_r/N \right\rceil$$

In the first formula and the second formula, R is the resources required for UCI multiplexing on the PUSCH, $O_{UCI}$ is the number of bits for UCI carried on the PUSCH, $L_{UCI}$ is the number of cyclic redundancy check (CRC) bits for the UCI, $\beta_{offset}^{PUSCH}$ is a beta offset between data and the UCI, $N_{symb,slot}^{PUSCH}$ is the number of OFDM symbols of the symb, slot PUSCH in a first slot or is the maximum or minimum number of OFDM symbols in all the slots for PUSCH transmission, $M_{SC}^{UCI}(l)$ is the number of sub-carriers (SC) that can be used for UCI transmission in OFDM symbol l, $C_{UCI-SCH}$ is the number of code blocks for uplink shared channel (UL-SCH) of the PUSCH transmission, $K_r$ is the r-th code block size for UL-SCH of the PUSCH transmission, N is the number of slots used for the PUSCH transmission.

In an embodiment, the determining the resources required for UCI multiplexing on the PUSCH based on resources for the PUSCH in one slot includes: determining the resources required for UCI multiplexing on the PUSCH based on resources used for the PUSCH in a first slot; or determining the resources required for UCI multiplexing on the PUSCH based on resources used for the PUSCH in a last slot; or determining the resources required for UCI multiplexing on the PUSCH based on resources in a slot with the maximum number of OFDM symbols among multiple slots corresponding to PUSCH transmission; or determining the resources required for UCI multiplexing on the PUSCH based on resources in a slot with the minimum number of OFDM symbols among multiple slots corresponding to PUSCH transmission.

Scheme 2, determining the resources required for UCI multiplexing on the PUSCH based on resources for the PUSCH in a nominal transmission.

For a PUSCH transmitting one TB over multiple slots, in case that a PUCCH and the PUSCH overlap in one or more slots, the resources required for UCI multiplexing on the PUSCH may be determined based on resources for the PUSCH in a nominal transmission.

In an embodiment, the determining the resources required for UCI multiplexing on the PUSCH based on resources for the PUSCH in a nominal transmission includes: determining the resources required for UCI multiplexing on the PUSCH based on the number of OFDM symbols of the PUSCH in a nominal transmission without segmentation.

In an embodiment, the resources used for a nominal transmission may be the number of OFDM symbols used for a nominal transmission determined based on scheduling DCI or configuration information.

In an embodiment, in case of determining the resources required for UCI multiplexing on the PUSCH based on the number of OFDM symbols of the PUSCH in a nominal transmission without segmentation, the resources required for UCI multiplexing on the PUSCH may be determined based on the following third formula or fourth formula.

The third formula is:

$$R = \left\lceil (O_{UCI} + L_{UCI}) \times \beta_{offset}^{PUSCH} \times \sum_{l=0}^{N_{symb,norminal}^{PUSCH}-1} M_{SC}^{UCI}(l) \bigg/ \sum_{r=0}^{C_{UCI-SCH}-1} K_r \right\rceil$$

The fourth formula is:

$$R = \left\lceil (O_{UCI} + L_{UCI}) \times \beta_{offset}^{PUSCH} \times \sum_{l=0}^{N_{symb,norminal}^{PUSCH}-1} M_{SC}^{UCI}(l) \bigg/ \sum_{r=0}^{C_{UCI-SCH}-1} K_r / M \right\rceil$$

In the third formula and fourth formula, R is the resources required for UCI multiplexing on the PUSCH, $O_{UCI}$ is the number of bits for UCI carried on the PUSCH, $L_{UCI}$ is the number of CRC bits for the UCI, $\beta_{offset}^{PUSCH}$ is a beta offset between data and the UCI, $N_{symb, norminal}^{PUSCH}$ is the number of OFDM symbols of the PUSCH in a nominal transmission, $M_{SC}^{UCI}(l)$ is the number of SCs that can be used for UCI transmission in OFDM symbol l, $C_{UCI-SCH}$ is the number of code blocks for UL-SCH of the PUSCH transmission, $K_r$ is the r-th code block size for UL-SCH of the PUSCH transmission, M is the number of nominal transmissions used for the PUSCH transmission.

Scheme 3, determining the resources required for UCI multiplexing on the PUSCH based on resources for the PUSCH in multiple slots.

For a PUSCH transmitting one TB over multiple slots, in case that a PUCCH and a PUSCH overlap in one or more slots, the resources required for UCI multiplexing on the PUSCH may be determined based on the resources for the PUSCH in multiple slots.

For example, the multiple slots include two or more slots.

In an embodiment, the determining the resources required for UCI multiplexing on the PUSCH based on resources for the PUSCH in multiple slots includes: determining the resources required for UCI multiplexing on the PUSCH based on the number of OFDM symbols in the multiple slots where the PUSCH transmits one TB.

In an embodiment, in case of determining the resources required for UCI multiplexing on the PUSCH based on the number of OFDM symbols in the multiple slots where the PUSCH transmits one TB, the resources required for UCI multiplexing on the PUSCH may be determined based on the following fifth formula.

The fifth formula is:

$$R = \left\lceil (O_{UCI} + L_{UCI}) \times \beta_{offset}^{PUSCH} \times \sum_{l=0}^{N_{symb,total}^{PUSCH}-1} M_{SC}^{UCI}(l) \bigg/ \sum_{r=0}^{C_{UCI-SCH}-1} K_r \right\rceil$$

In the fifth formula, R is the resources required for UCI multiplexing on the PUSCH, $O_{UCI}$ is the number of bits for UCI carried on the PUSCH, $L_{UCI}$ is the number of CRC bits for the UCI, $\beta_{offset}^{PUSCH}$ is a beta offset between data and the UCI, $N_{symb, total}^{PUSCH}$ is the total number of OFDM symbols of the PUSCH, $M_{SC}^{UCI}(l)$ is the number of SCs that can be used for UCI transmission in OFDM symbol l, $C_{UCI-SCH}$ is the number of code blocks for UL-SCH of the PUSCH transmission, $K_r$ is the r-th code block size for UL-SCH of the PUSCH transmission.

In an embodiment, in case that one TB is transmitted over multiple slots for the PISSCH, $N_{symb, total}^{PUSCH}$ is the total number of OFDM symbols of the PUSCH in the multiple slots; or in case that the PUSCH transmission has multiple segments, $N_{symb, total}^{PUSCH}$ is the total number of OFDM symbols of the PUSCH within all the segments.

In the present application, the resources required for UCI multiplexing on the PUSCH may be determined according to any one of the above schemes.

In an embodiment, in case of determining the upper limit of resources used for UCI multiplexing on the PUSCH, the upper limit of resources used for UCI multiplexing on the PUSCH may be determined based on resources for PUSCH overlapping with PUCCH according to any one of the following schemes.

Scheme 1, determining the upper limit of resources used for UCI multiplexing on the PUSCH based on the number of OFDM symbols overlapping with the PUCCH.

In the scheme 1, the upper limit of resources used for UCI multiplexing on the PUSCH may be determined based on a sixth formula; or a smaller value of a value obtained by a seventh formula and a value obtained by an eighth formula may be determined to be the upper limit of resources used for UCI multiplexing on the PUSCH.

The sixth formula is:

$$T = \left\lceil \alpha \times \sum_{l=l_0}^{N_{symb,overlap}^{PUSCH}-1} M_{SC}^{UCI}(l) \right\rceil$$

The seventh formula is:

$$T = \left\lceil \alpha \times \sum_{l=l_0}^{N_{symb,total}^{PUSCH}-1} M_{SC}^{UCI}(l) \right\rceil$$

The eighth formula is:

$$T = \left\lceil \sum_{l=l_0}^{N_{symb,overlap}^{PUSCH}-1} M_{SC}^{UCI}(l) \right\rceil$$

In the sixth formula, the seventh formula, and the eighth formula, T is the upper limit of resources used for UCI multiplexing on the PUSCH, α is a coefficient for upper limit of resources, $N_{symb, overlap}^{PUSCH}$ is the number of symbols that conflict with the PUCCH among the symbols of the PUSCH, $l_0$ is an OFDM symbol index of a symbol where the UCI mapping starts among the symbols of the PUSCH, $M_{SC}^{UCI}(l)$ is the number of SCs that can be used for UCI transmission in OFDM symbol l, $N_{symb,\,total}^{PUSCH}$ is the total number of OFDM symbols of the PUSCH.

It should be noted that for the HARQ-ACK, $l_0$ is a first OFDM symbol index after a first DMRS group; or for the CSI, $l_0$ is 0; or for the HARQ-ACK and the CSI, $l_0$ is 0.

Scheme 2, determining the upper limit of resources used for UCI multiplexing on the PUSCH based on the number of OFDM symbols of the PUSCH in a slot where the PUCCH and the PUSCH overlap.

In the scheme 2, the upper limit of resources used for UCI multiplexing on the PUSCH may be determined based on a ninth formula; or a smaller value of a value obtained by a tenth formula and a value obtained by an eleventh formula may be determined to be the upper limit of resources used for UCI multiplexing on the PUSCH.

The ninth formula is:

$$T = \left\lceil \alpha \times \sum_{l=l_0}^{N_{symb,\,slotoverlap}^{PUSCH}-1} M_{SC}^{UCI}(l) \right\rceil$$

The tenth formula is:

$$T = \left\lceil \alpha \times \sum_{l=l_0}^{N_{symb,\,total}^{PUSCH}-1} M_{SC}^{UCI}(l) \right\rceil$$

The eleventh formula is:

$$T = \left\lceil \sum_{l=l_0}^{N_{symb,\,slotoverlap}^{PUSCH}-1} M_{SC}^{UCI}(l) \right\rceil$$

In the ninth formula, the tenth formula, and the eleventh formula, T is the upper limit of resources used for UCI multiplexing on the PUSCH, $\alpha$ is a coefficient for upper limit of resources, $N_{symb,\,slotoverlap}^{PUSCH}$ is the number of OFDM symbols of the PUSCH in at least one slot where the PUSCH transmission overlaps with the PUCCH, $l_0$ is an OFDM symbol index where the UCI mapping starts among the symbols of the PUSCH, $M_{SC}^{UCI}(l)$ is the number of SCs that can be used for UCI transmission in OFDM symbol l, $N_{symb,\,total}^{PUSCH}$ is the total number of OFDM symbols of the PUSCH.

Scheme 3, in case that the PUSCH is segmented in a slot, determining the upper limit of resources used for UCI multiplexing on the PUSCH based on the number of symbols of actual PUSCH overlapping with the PUCCH.

In the scheme 3, in case that the PUSCH is segmented in a slot, in case of determining the upper limit of resources used for UCI multiplexing on the PUSCH based on the number of symbols of actual PUSCH (segmented PUSCH) overlapping with the PUCCH, the upper limit of resources used for UCI multiplexing on the PUSCH may be determined based on a twelfth formula; or a smaller value of a value obtained by a thirteenth formula and a value obtained by a fourteenth formula may be determined to be the upper limit of resources used for UCI multiplexing on the PUSCH.

The twelfth formula is:

$$T = \left\lceil \alpha \times \sum_{l=l_0}^{N_{symb,\,actual}^{PUSCH}-1} M_{SC}^{UCI}(l) \right\rceil$$

The thirteenth formula is:

$$T = \left\lceil \alpha \times \sum_{l=l_0}^{N_{symb,\,total}^{PUSCH}-1} M_{SC}^{UCI}(l) \right\rceil$$

The fourteenth formula is:

$$T = \left\lceil \sum_{l=l_0}^{N_{symb,\,actual}^{PUSCH}-1} M_{SC}^{UCI}(l) \right\rceil$$

In the twelfth formula, or the thirteenth formula, or the fourteenth formula, T is the upper limit of resources used for UCI multiplexing on the PUSCH, $\alpha$ is a coefficient for upper limit of resources, $N_{symb,\,total}^{PUSCH}$ is the total number of OFDM symbols of the PUSCH, $l_0$ is an OFDM symbol index where the UCI mapping starts among the symbols of the PUSCH, $M_{SC}^{UCI}(l)$ is the number of SCs that can be used for UCI transmission in OFDM symbol, $N_{symb,\,actual}^{PUSCH}$ is the number of OFDM symbols of at least one segmented PUSCH that overlaps with the PUCCH in case that the PUSCH is segmented for transmission.

In the present application, the upper limit of resources used for UCI multiplexing on the PUSCH may be determined based on any one of the above schemes. In addition to the above schemes, PUSCH resources used for UCI transmission in a slot may be taken as the upper limit of resources used for UCI multiplexing on the PUSCH. For example, the upper limit of resources used for UCI multiplexing on the PUSCH may be determined by using the following formula:

$$T = \left\lceil \alpha \times \sum_{l=l_0}^{N_{symb,\,all}^{PUSCH}-1} M_{SC}^{UCI}(l) \right\rceil$$

where T is the upper limit of resources used for UCI multiplexing on the PUSCH, $\alpha$ is a coefficient for upper limit of resources, $N_{symb,\,all}^{PUSCH}$ at is the number of OFDM symbols of the PUSCH in a slot, $l_0$ is an OFDM symbol index where the UCI mapping starts among the symbols used for the PUSCH, $M_{SC}^{UCI}(l)$ is the number of SCs that can be used for UCI transmission in OFDM symbol l.

It should be noted that after the upper limit of resources used for UCI multiplexing on the PUSCH is determined, in case that a first UCI and a second UCI other than the UCI are multiplexed on the PUSCH, an upper limit of resources used for first UCI multiplexing on the PUSCH is a obtained by subtracting resources used for the actual UCI transmission from the upper limit of resources used for UCI multiplexing on the PUSCH; and an upper limit of resources used for second UCI multiplexing on the PUSCH is obtained by subtracting resources used for the actual UCI transmission and actual first UCI transmission from the upper limit of resources used for UCI multiplexing on the PUSCH.

For example, in case that multiple UCI resources are multiplexed on the PUSCH, the upper limit of resources for the first UCI is determined by any one of the above schemes, the upper limit of resources for the second UCI is obtained by subtracting actual resources used for the first UCI from the upper limit of resources obtained according to the above rule, and the upper limit of resources for the third UCI is obtained by subtracting actual resources used for the first UCI and the second UCI from the upper limit of resources obtained according to the above rule, and so on, to determine the upper limit of resources for each UCI.

In the present application, the resources used for actual UCI transmission are determined based on the resources required for UCI multiplexing on the PUSCH and the upper limit of resources used for UCI multiplexing on the PUSCH, and the UCI is transmitted on the PUSCH based on the resources used for the actual UCI transmission. As such, for a PUSCH transmitting one TB over multiple slots, UCI multiplexing is supported on such multi-slot PUSCH, ensuring transmission performances of UCI and Multi-slot PUSCH.

Figure 2:
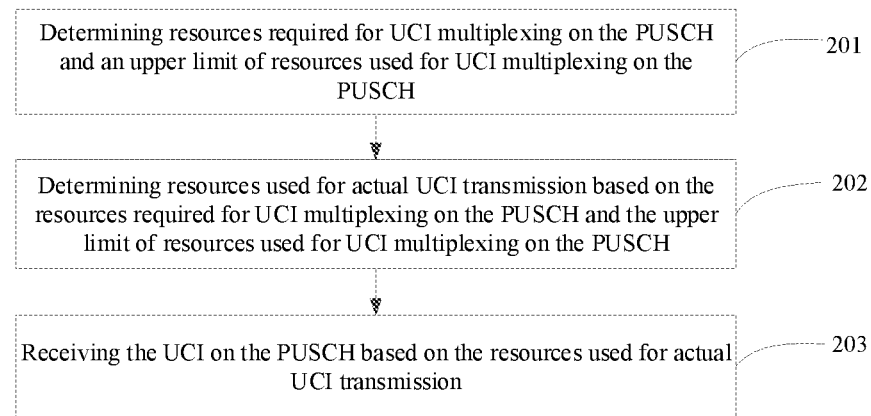
FIG. 2 is a schematic flowchart showing steps of a UCI multiplexing method applied to a network side device according to an embodiment of the present application.

FIG. 2 is a schematic flowchart showing steps of a UCI multiplexing method applied to a network side device according to an embodiment of the present application.

For a physical uplink shared channel (PUSCH) carrying a multi-slot transport block (TB), in case that the PUSCH and a physical uplink control channel (PUCCH) overlap in at least one slot, the UCI multiplexing method applied to the network side device includes the following steps:

step 201, determining resources required for UCI multiplexing on the PUSCH and an upper limit of resources used for UCI multiplexing on the PUSCH;

step 202, determining resources used for actual UCI transmission based on the resources required for UCI multiplexing on the PUSCH and the upper limit of resources used for UCI multiplexing on the PUSCH.

In an embodiment, in the step 102, a smaller of the resources required for UCI multiplexing on the PUSCH and the upper limit of resources used for UCI multiplexing on the PUSCH may be determined to be the resources used for actual UCI transmission, to ensure a validity of the resources used for actual UCI transmission.

Step 203: receiving the UCI on the PUSCH based on the resources used for the actual UCI transmission.

After the resources used for actual UCI transmission are determined, the UCI may be received on the PUSCH based on the resources used for the actual UCI transmission. As such, for a PUSCH transmitting one TB over multiple slots, UCI multiplexing is supported on such multi-slot PUSCH, ensuring transmission performances of UCI and multi-slot PUSCH.

In the embodiment of the present application, by determining the resources required for UCI multiplexing on the PUSCH and the upper limit of resources used for UCI multiplexing on the PUSCH, determining the resources used for actual UCI transmission based on the resources required for UCI multiplexing on the PUSCH and the upper limit of resources used for UCI multiplexing on the PUSCH, and receiving the UCI on the PUSCH based on the resources used for the actual UCI transmission, for a PUSCH transmitting one TB over multiple slots, UCI multiplexing is supported on such multi-slot PUSCH, ensuring transmission performances of UCI and multi-slot PUSCH.

In an embodiment, the determining the resources required for UCI multiplexing on the PUSCH includes any one of the following schemes.

Scheme 1, determining the resources required for UCI multiplexing on the PUSCH based on resources for the PUSCH in one slot.

In an embodiment, the determining the resources required for UCI multiplexing on the PUSCH based on resources for the PUSCH in one slot includes: determining the resources required for UCI multiplexing on the PUSCH based on the number of OFDM symbols of the PUSCH in one slot.

In an embodiment, in case of determining the resources required for UCI multiplexing on the PUSCH based on the number of OFDM symbols of the PUSCH in one time slot, the resources required for UCI multiplexing on the PUSCH may be determined based on the following first formula or second formula.

The first formula is:

$$R = \left\lceil (O_{UCI} + L_{UCI}) \times \beta_{offset}^{PUSCH} \times \sum_{l=0}^{N_{symb,slot}^{PUSCH}-1} M_{SC}^{UCI}(l) \bigg/ \sum_{r=0}^{C_{UCI-SCH}-1} K_r \right\rceil$$

The second formula is:

$$R = \left\lceil (O_{UCI} + L_{UCI}) \times \beta_{offset}^{PUSCH} \times \sum_{l=0}^{N_{symb,slot}^{PUSCH}-1} M_{SC}^{UCI}(l) \bigg/ \sum_{r=0}^{C_{UCI-SCH}-1} K_r/N \right\rceil$$

In the first formula and the second formula, R is the resources required for UCI multiplexing on the PUSCH, $O_{UCI}$ is the number of bits for UCI carried on the PUSCH, $L_{UCI}$ is the number of cyclic redundancy check (CRC) bits for the UCI, $\beta_{offset}^{PUSCH}$ is a beta offset between data and the UCI, $N_{symb,slot}^{PUSCH}$ is the number of OFDM symbols of the PUSCH in a first slot or is the maximum or minimum number of OFDM symbols in all the slots for PUSCH transmission, $M_{SC}^{UCI}(l)$ is the number of sub-carriers (SC) used for UCI transmission in OFDM symbol l, $C_{UCI-SCH}$ is the number of code blocks for uplink shared channel (UL-SCH) of the PUSCH transmission, $K_r$ is the r-th code block size for UL-SCH of the PUSCH transmission, N is the number of slots used for the PUSCH transmission.

Scheme 2, determining the resources required for UCI multiplexing on the PUSCH based on resources for the PUSCH in a nominal transmission.

In an embodiment, the determining the resources required for UCI multiplexing on the PUSCH based on resources for the PUSCH in a nominal transmission includes: determining the resources required for UCI multiplexing on the PUSCH based on the number of OFDM symbols of the PUSCH in a nominal transmission without segmentation.

In an embodiment, in case of determining the resources required for UCI multiplexing on the PUSCH based on the number of OFDM symbols of the PUSCH in a nominal transmission without segmentation, the resources required for UCI multiplexing on the PUSCH may be determined based on the following third formula or fourth formula.

The third formula is:

$$R = \left\lceil (O_{UCI} + L_{UCI}) \times \beta_{offset}^{PUSCH} \times \sum_{l=0}^{N_{symb,norminal}^{PUSCH}-1} M_{SC}^{UCI}(l) \Big/ \sum_{r=0}^{C_{UCI-SCH}-1} K_r \right\rceil$$

The fourth formula is:

$$R = \left\lceil (O_{UCI} + L_{UCI}) \times \beta_{offset}^{PUSCH} \times \sum_{l=0}^{N_{symb,norminal}^{PUSCH}-1} M_{SC}^{UCI}(l) \Big/ \sum_{r=0}^{C_{UCI-SCH}-1} K_r/M \right\rceil$$

In the third formula and fourth formula, R is the resources required for UCI multiplexing on the PUSCH, $O_{UCI}$ is the number of bits for UCI carried on the PUSCH, $L_{UCI}$ is the number of CRC bits for the UCI, $\beta_{offset}^{PUSCH}$ is a beta offset between data and the UCI, $N_{symb,norminal}^{PUSCH}$ is the number of OFDM symbols of the PUSCH in a nominal transmission, $M_{SC}^{UCI}(l)$ is the number of SCs that can be used for UCI transmission in OFDM symbol l, $C_{UCI-SCH}$ is the number of code blocks for UL-SCH of the PUSCH transmission, $K_r$ is the r-th code block size for UL-SCH of the PUSCH transmission, M is the number of nominal transmissions used for the PUSCH transmission.

Scheme 3, determining the resources required for UCI multiplexing on the PUSCH based on resources for the PUSCH in multiple slots.

In an embodiment, the determining the resources required for UCI multiplexing on the PUSCH based on resources for the PUSCH in multiple slots includes: determining the resources required for UCI multiplexing on the PUSCH based on the number of OFDM symbols in the multiple slots where the PUSCH transmits one TB.

In an embodiment, in case of determining the resources required for UCI multiplexing on the PUSCH based on the number of OFDM symbols in the multiple slots where the PUSCH transmits one TB, the resources required for UCI multiplexing on the PUSCH may be determined based on the following fifth formula.

The fifth formula is:

$$R = \left\lceil (O_{UCI} + L_{UCI}) \times \beta_{offset}^{PUSCH} \times \sum_{l=0}^{N_{symb,total}^{PUSCH}-1} M_{SC}^{UCI}(l) \Big/ \sum_{r=0}^{C_{UCI-SCH}-1} K_r \right\rceil$$

In the fifth formula, R is the resources required for UCI multiplexing on the PUSCH, $O_{UCI}$ is the number of bits for UCI carried on the PUSCH, $L_{UCI}$ is the number of CRC bits for the UCI, $\beta_{offset}^{PUSCH}$ is a beta offset between data and the UCI, $N_{symb,total}^{PUSCH}$ is the total number of OFDM symbols of the PUSCH, $M_{SC}^{UCI}(l)$ is the number of SCs that can be used for UCI transmission in OFDM symbol l, $C_{UCI-SCH}$ is the number of code blocks for UL-SCH of the PUSCH transmission, $K_r$ is the r-th code block size for UL-SCH of the PUSCH transmission.

In an embodiment, in case that one TB is transmitted over multiple slots for the PISSCH, $N_{symb,total}^{PUSCH}$ is the total number of OFDM symbols of the PUSCH in the multiple slots; or in case that the PUSCH transmission has multiple segments, $N_{symb,total}^{PUSCH}$ is the total number of OFDM symbols of the PUSCH within all the segments.

In the present application, the resources required for UCI multiplexing on the PUSCH may be determined according to any one of the above schemes.

In an embodiment, in case of determining the upper limit of resources used for UCI multiplexing on the PUSCH, the upper limit of resources used for UCI multiplexing on the PUSCH may be determined based on resources for PUSCH overlapping with PUCCH according to any one of the following schemes.

Scheme 1, determining the upper limit of resources used for UCI multiplexing on the PUSCH based on the number of OFDM symbols overlapping with the PUCCH.

In the scheme 1, the upper limit of resources used for UCI multiplexing on the PUSCH may be determined based on a sixth formula; or a smaller value of a value obtained by a seventh formula and a value obtained by an eighth formula may be determined to be the upper limit of resources used for UCI multiplexing on the PUSCH.

The sixth formula is:

$$T = \left\lceil \alpha \times \sum_{l=l_0}^{N_{symb,overlap}^{PUSCH}-1} M_{SC}^{UCI}(l) \right\rceil$$

The seventh formula is:

$$T = \left\lceil \alpha \times \sum_{l=l_0}^{N_{symb,total}^{PUSCH}-1} M_{SC}^{UCI}(l) \right\rceil$$

The eighth formula is:

$$T = \left\lceil \sum_{l=l_0}^{N_{symb,overlap}^{PUSCH}-1} M_{SC}^{UCI}(l) \right\rceil$$

In the sixth formula, the seventh formula, and the eighth formula, T is the upper limit of resources used for UCI multiplexing on the PUSCH, α is a coefficient for upper limit of resources, $N_{symb,overlap}^{PUSCH}$ is the number of symbols that conflict with the PUCCH among the symbols of the PUSCH, $l_0$ is an OFDM symbol index of a symbol where the UCI mapping starts among the symbols of the PUSCH, $M_{SC}^{UCI}(l)$ is the number of SCs that can be used for UCI transmission in OFDM symbol l, $N_{symb,total}^{PUSCH}$ is the total number of OFDM symbols of the PUSCH.

It should be noted that for the HARQ-ACK, $l_0$ is a first OFDM symbol index after a first DMRS group; or for the CSI, $l_0$ is 0; or for the HARQ-ACK and the CSI, $l_0$ is 0.

Scheme 2, determining the upper limit of resources used for UCI multiplexing on the PUSCH based on the number of OFDM symbols of the PUSCH in a slot where the PUCCH and the PUSCH overlap.

In the scheme 2, the upper limit of resources used for UCI multiplexing on the PUSCH may be determined based on a ninth formula; or a smaller value of a value obtained by a tenth formula and a value obtained by an eleventh formula may be determined to be the upper limit of resources used for UCI multiplexing on the PUSCH.

The ninth formula is:

$$T = \left\lceil \alpha \times \sum_{l=l_0}^{N_{symb,slotoverlap}^{PUSCH}-1} M_{SC}^{UCI}(l) \right\rceil$$

The tenth formula is:

$$T = \left\lfloor \alpha \times \sum_{l=l_0}^{N_{symb,total}^{PUSCH}-1} M_{SC}^{UCI}(l) \right\rfloor$$

The eleventh formula is:

$$T = \left\lceil \sum_{l=l_0}^{N_{symb,slotoverlap}^{PUSCH}-1} M_{SC}^{UCI}(l) \right\rceil$$

In the ninth formula, the tenth formula, and the eleventh formula, T is the upper limit of resources used for UCI multiplexing on the PUSCH, $\alpha$ is a coefficient for upper limit of resources, $N_{symb,\,slotoverlap}^{PUSCH}$ is the number of OFDM symbols of the PUSCH in at least one slot where the PUSCH transmission overlaps with the PUCCH, $l_0$ is an OFDM symbol index where the UCI mapping starts among the symbols of the PUSCH, $M_{SC}^{UCI}(l)$ is the number of SCs that can be used for UCI transmission in OFDM symbol l, $N_{symb,\,total}^{PUSCH}$ is the total number of OFDM symbols of the PUSCH.

Scheme 3, in case that the PUSCH is segmented in a slot, determining the upper limit of resources used for UCI multiplexing on the PUSCH based on the number of symbols of actual PUSCH overlapping with the PUCCH.

In the scheme 3, in case that the PUSCH is segmented in a slot, in case of determining the upper limit of resources used for UCI multiplexing on the PUSCH based on the number of symbols of actual PUSCH (segmented PUSCH) overlapping with the PUCCH, the upper limit of resources used for UCI multiplexing on the PUSCH may be determined based on a twelfth formula; or a smaller value of a value obtained by a thirteenth formula and a value obtained by a fourteenth formula may be determined to be the upper limit of resources used for UCI multiplexing on the PUSCH.

The twelfth formula is:

$$T = \left\lceil \alpha \times \sum_{l=l_0}^{N_{symb,actual}^{PUSCH}-1} M_{SC}^{UCI}(l) \right\rceil$$

The thirteenth formula is:

$$T = \left\lceil \alpha \times \sum_{l=l_0}^{N_{symb,total}^{PUSCH}-1} M_{SC}^{UCI}(l) \right\rceil$$

The fourteenth formula is:

$$T = \left\lceil \sum_{l=l_0}^{N_{symb,actual}^{PUSCH}-1} M_{SC}^{UCI}(l) \right\rceil$$

In the twelfth formula, or the thirteenth formula, or the fourteenth formula, T is the upper limit of resources used for UCI multiplexing on the PUSCH, $\alpha$ is a coefficient for upper limit of resources, $N_{symb,\,total}^{PUSCH}$ is the total number of OFDM symbols of the PUSCH, $l_0$ is an OFDM symbol index where the UCI mapping starts among the symbols of the PUSCH, $M_{SC}^{UCI}(l)$ is the number of SCs that can be used for UCI transmission in OFDM symbol l, $N_{symb,\,actual}^{PUSCH}$ is the number of OFDM symbols of at least one segmented PUSCH that overlaps with the PUCCH in case that the PUSCH is segmented for transmission.

In the present application, the upper limit of resources used for UCI multiplexing on the PUSCH may be determined based on any one of the above schemes. In addition to the above schemes, PUSCH resources used for UCI transmission in a slot may be taken as the upper limit of resources used for UCI multiplexing on the PUSCH. For example, the upper limit of resources used for UCI multiplexing on the PUSCH may be determined by using the following formula:

$$T = \left\lceil \alpha \times \sum_{l=l_0}^{N_{symb,all}^{PUSCH}-1} M_{SC}^{UCI}(l) \right\rceil$$

where T is the upper limit of resources used for UCI multiplexing on the PUSCH, $\alpha$ is a coefficient for upper limit of resources, $N_{symb,\,all}^{PUSCH}$ all is the number of OFDM symbols of the PUSCH in a slot, $l_0$ is an OFDM symbol index where the UCI mapping starts among the symbols used for the PUSCH, $M_{SC}^{UCI}(l)$ is the number of SCs that can be used for UCI transmission in OFDM symbol l.

It should be noted that after the upper limit of resources used for UCI multiplexing on the PUSCH is determined, in case that a first UCI and a second UCI other than the UCI are multiplexed on the PUSCH, an upper limit of resources used for first UCI multiplexing on the PUSCH is a obtained by subtracting resources used for the actual UCI transmission from the upper limit of resources used for UCI multiplexing on the PUSCH; and an upper limit of resources used for second UCI multiplexing on the PUSCH is obtained by subtracting resources used for the actual UCI transmission and actual first UCI transmission from the upper limit of resources used for UCI multiplexing on the PUSCH.

It should be noted that the for detailed description for the embodiments applied to the network side device please refer to associated contents in the embodiments applied to the terminal, which is not repeated herein.

The present application is described below through embodiments.

Embodiment One

Figure 3:
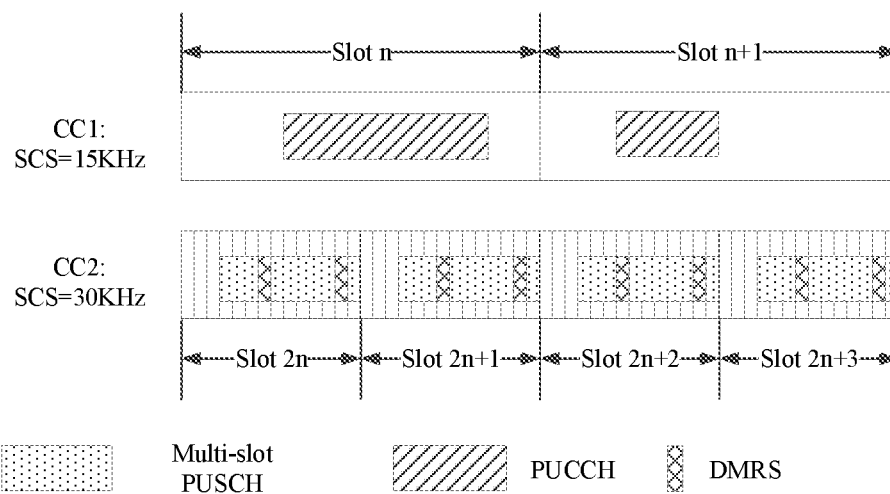
FIG. 3 is a first schematic diagram of determining a resource required for UCI multiplexing on a physical uplink shared channel (PUSCH) according to an embodiment of the present application.

As shown in FIG. 3, a sub-carrier spacing (SCS) of a component carrier (CC1) where a PUCCH is located is 15 kHz and an SCS of a component carrier (CC2) where a PUSCH is located is 30 kHz. A TB for the PUSCH is jointly encoded and transmitted in the PUSCH resources from slot 2n to slot 2n+3. A PUCCH carrying HARQ-ACK is transmitted in slot n, and the slot n overlaps with two slots for PUSCH transmissions in time domain. Another PUCCH carrying HARQ-ACK is transmitted in slot n+1, and the slot n+1 overlaps with one slot for PUSCH transmissions in time domain.

In this embodiment, any one of the following schemes may be used for determining the resources R required for UCI multiplexing on the PUSCH.

Scheme 1, determining the resources required for UCI multiplexing on the PUSCH based on the above fifth formula, where $N_{symb,\ total}^{PUSCH}$ is the total number of OFDM symbols of the PUSCH. For the resources required for PUCCH multiplexing on the PUSCH in slot n, a value of $N_{symb,\ total}^{PUSCH}$ is 44.

Scheme 2, determining the resources required for UCI multiplexing on the PUSCH based on the above first formula, where $N_{symb,\ slot}^{PUSCH}$ is the number of OFDM symbols of the PUSCH in a first slot. For the resources required for PUCCH multiplexing on the PUSCH in slot n, a value of $N_{symb,\ slot}^{PUSCH}$ is 11.

Scheme 3, determining the resources required for UCI multiplexing on the PUSCH based on the above second formula, where $N_{symb,\ slot}^{PUSCH}$ slot is the number of OFDM symbols of the PUSCH in a first slot, N is the number of slots used for the PUSCH transmission. For the resources required for PUCCH multiplexing on the PUSCH in slot n, a value of $N_{symb,\ slot}^{PUSCH}$ is 11 and a value of N is 4.

In this embodiment, any one of the following schemes may be used for determining the upper limit T of resources used for UCI multiplexing on the PUSCH.

Figure 4:
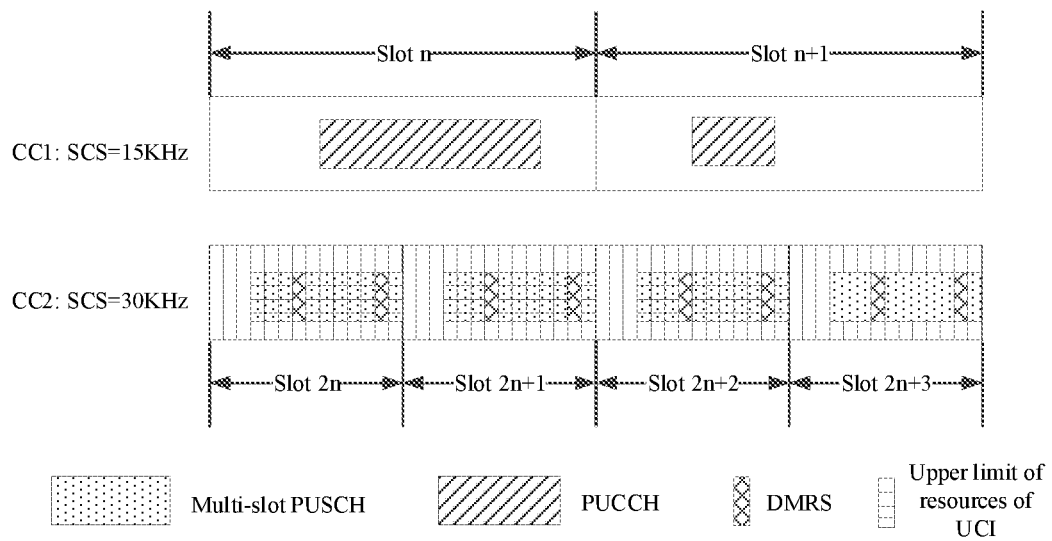
FIG. 4 is a first schematic diagram of determining an upper limit of resources used for UCI multiplexing on a PUSCH according to an embodiment of the present application.

Scheme 1, as shown in FIG. 4, determining the upper limit of resources used for UCI multiplexing on the number of symbols used for PUSCH in a slot where the PUCCH and the PUSCH overlap.

In the scheme 1, the upper limit of resources used for UCI multiplexing may be determined based on the above ninth formula, where $N_{symb,\ slotoverlap}^{PUSCH}$ is the number of OFDM symbols of the PUSCH in one or more slots where the PUSCH transmission overlaps with the PUCCH. For the upper limit of resources used for PUCCH multiplexing on the PUSCH in slot n, a value of $N_{symb,\ slotoverlap}^{PUSCH}$ is 22.

The upper limit of resources used for UCI multiplexing may also be determined based on a smaller value between the above tenth formula and the above eleventh formula, where $N_{symb,\ slotoverlap}^{PUSCH}$ is the number of OFDM symbols of the PUSCH in one or more slots where the PUSCH transmission overlaps with the PUCCH, $N_{symb,\ total}^{PUSCH}$ total is the total number of OFDM symbols of the PUSCH. For the upper limit of resources used for PUCCH multiplexing on the PUSCH in slot n, a value of $N_{symb,\ slotoverlap}^{PUSCH}$ is 22 and a value of $N_{symb,\ total}^{PUSCH}$ is 44.

Figure 5:
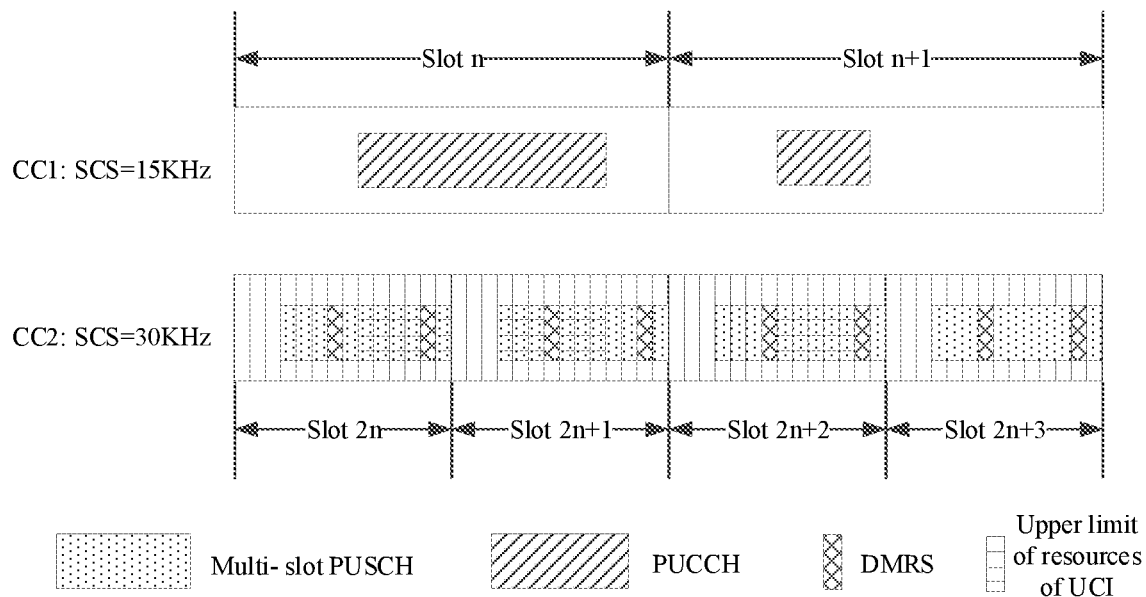
FIG. 5 is a second schematic diagram of determining an upper limit of resources used for UCI multiplexing on a PUSCH according to an embodiment of the present application.

Scheme 2, as shown in FIG. 5, determining the upper limit of resources used for UCI multiplexing based on the number of OFDM symbols overlapping with the PUCCH.

In the scheme 2, the upper limit of resources used for UCI multiplexing may be determined based on the above sixth formula, where $N_{symb,\ overlap}^{PUSCH}$ is the number of OFDM symbols that conflict with the PUCCH among the symbols of the PUSCH. For the upper limit of resources used for PUCCH multiplexing on the PUSCH in slot n, a value of $N_{symb,\ overlap}^{PUSCH}$ is 13.

The upper limit of resources used for UCI multiplexing may also be determined based on a smaller value between the above seventh formula and the above eighth formula, where $N_{symb,\ overlap}^{PUSCH}$ is the number of OFDM symbols that conflict with the PUCCH among the symbols of the PUSCH, $N_{symb,\ total}^{PUSCH}$ is the total number of OFDM symbols of the PUSCH. For the upper limit of resources used for PUCCH multiplexing on the PUSCH in slot n, a value of $N_{symb,\ overlap}^{PUSCH}$ is 13 and a value of $N_{symb,\ total}^{PUSCH}$ is 44.

The resources, such as the number of REs, used for actual UCI multiplexing is determined based on a smaller value between the resources R required for UCI multiplexing and the upper limit T of resources used for UCI multiplexing, and the UCI multiplexing is performed on the PUSCH within the number of REs.

Embodiment Two

Figure 6:
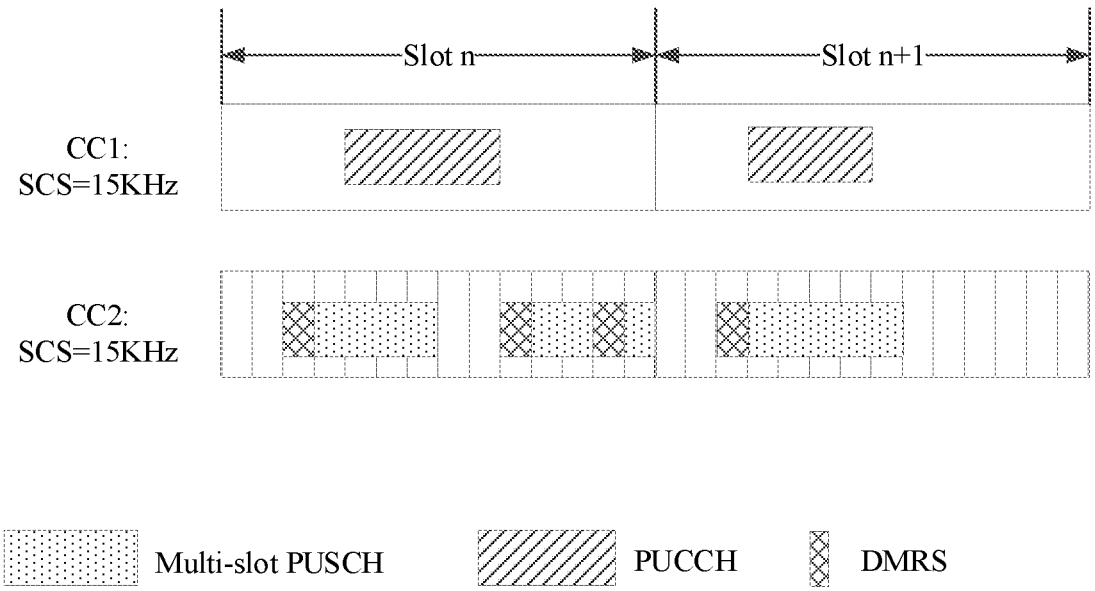
FIG. 6 is a second schematic diagram of determining a resource required for UCI multiplexing on a PUSCH according to an embodiment of the present application.

As shown in FIG. 6, both SCSs of component carriers where the PUCCH and PUSCH are located are 15 kHz. A TB for the PUSCH occupies two nominal transmissions and one nominal transmission occupies 10 symbols, then the TB for the PUSCH is jointly encoded and transmitted in the resources of two nominal transmissions. A nominal transmission is segmented due to overlapping with invalid symbols. As shown in FIG. 6, a nominal transmission includes two actual transmission, the first actual transmission in the first nominal transmission occupies 5 symbols, and the second actual transmission in the first nominal transmission occupies 3 symbols; and the first actual transmission in the second nominal transmission occupies 2 symbols, and the second actual transmission in the second nominal transmission occupies 6 symbols. A PUCCH carrying HARQ-ACK is transmitted in slot n, which overlaps with the PUSCH in time domain. Another PUCCH carrying HARQ-ACK is transmitted in slot n+1, which also overlaps with the PUSCH in time domain.

The resources required for HARQ-ACK transmission may be determined based on the above fourth formula, where $N_{symb,\ norminal}^{PUSCH}$ is the number of OFDM symbols of the PUSCH in a nominal transmission. For the upper limit of resources used for PUCCH multiplexing on the PUSCH in slot n and slot n+1, a value of $N_{symb,\ norminal}^{PUSCH}$ is 10.

Figure 7:
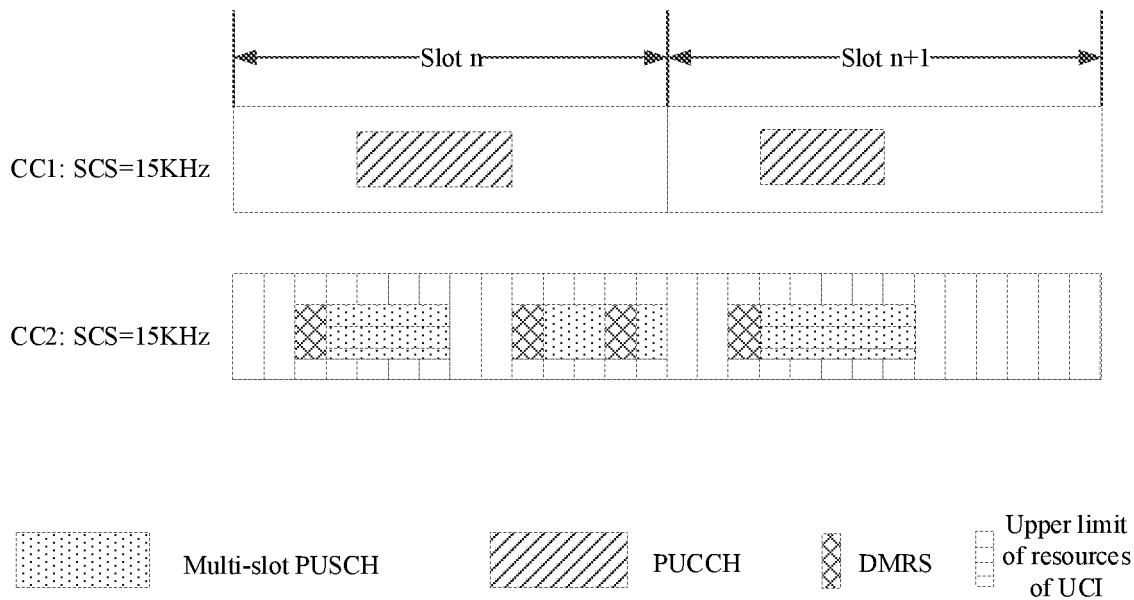
FIG. 7 is a third schematic diagram of determining an upper limit of resources used for UCI multiplexing on a PUSCH according to an embodiment of the present application.

In case of determining the upper limit of resources used for UCI multiplexing on the PUSCH, as shown in FIG. 7, the upper limit of resources used for UCI multiplexing may be determined based on the number of symbols of actual PUSCH (segmented PUSCH) overlapping with the PUCCH.

In this embodiment, the upper limit of resources used for UCI multiplexing may be determined based on the above twelfth formula, where $N_{symb,\ actual}^{PUSCH}$ is the number of OFDM symbols used for transmission of one or more segmented PUSCHs that conflict with the PUCCH in case that the PUSCH is segmented for transmission. For the upper limit of resources used for PUCCH multiplexing on the PUSCH in slot n, a value of $N_{symb,\ actual}^{PUSCH}$ is 5. For the upper limit of resources used for PUCCH multiplexing on the PUSCH in slot n+1, a value of $N_{symb,\ actual}^{PUSCH}$ is 6.

The upper limit of resources used for UCI multiplexing may also be determined based on a smaller value between the above thirteenth formula and the above fourteenth formula, where $N_{symb,\ actual}^{PUSCH}$ is the number of OFDM symbols used for transmission of one or more segmented PUSCHs that conflict with the PUCCH in case that the PUSCH is segmented for transmission, $N_{symb,\ total}^{PUSCH}$ is the total number of OFDM symbols of the PUSCH. For the upper limit of resources used for PUCCH multiplexing on the PUSCH in slot n, a value of $N_{symb,\ actual}^{PUSCH}$ is 5. For the upper limit of resources used for PUCCH multiplexing on the PUSCH in slot n+1, a value of $N_{symb,\ actual}^{PUSCH}$ is 6. For the upper limit of resources used for PUCCH multiplexing on the PUSCH in any of slot n or slot n+1, a value of $N_{symb,\ total}^{PUSCH}$ is 20.

Figure 8:
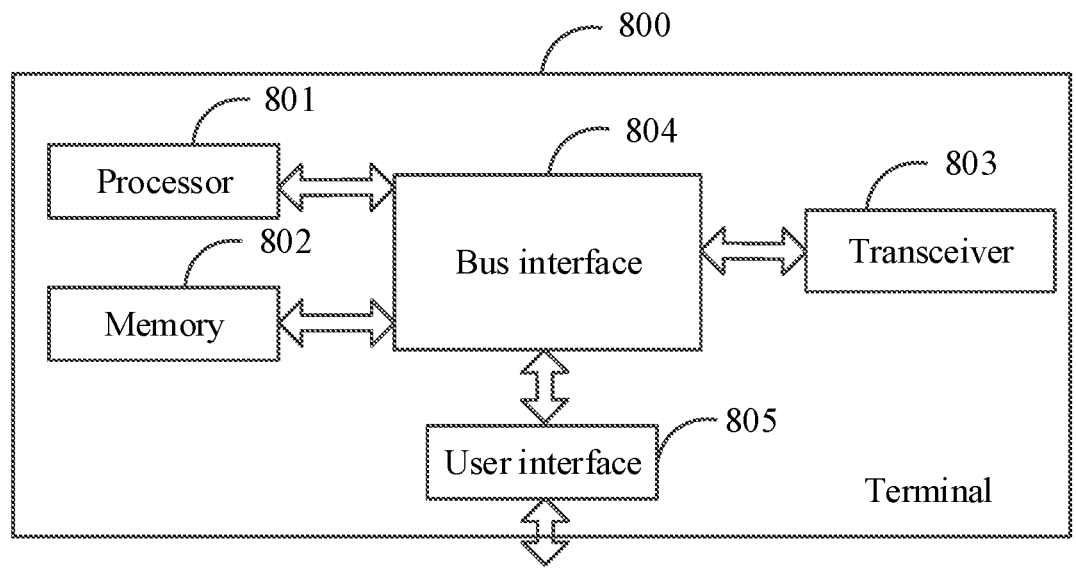
FIG. 8 is a schematic structural diagram of a terminal according to an embodiment of the present application.

FIG. 8 is a schematic structural diagram of a terminal according to an embodiment of the present application. As shown in FIG. 8, a terminal 800 includes a memory 802, a transceiver 803 and a processor 801; where, the processor 801 and the memory 802 may also be physically separated.

The memory 802 is used for storing computer programs; the transceiver 803 is used for receiving and transmitting data under a control of the processor 801.

In FIG. 8, a bus system 804 may include any number of interconnected buses and bridges, linked together by various circuits of one or more processors represented by processor 801 and circuits of memories represented by memory 802. The bus system 804 may also link various other circuits such as peripheral devices, regulators and power management circuits. The bus interface provides an interface. The transceiver 803 may be multiple components, that is, including a transmitter and a receiver, providing units for communication with various other devices on transmission media such as wireless channels, wired channels, optical fibers, etc. For different user devices, the user interface 805 may also be an interface capable of connecting external and internal devices, including but not limited to small keyboards, displays, speakers, microphones, joysticks, etc.

The processor 801 is used for managing the bus architecture and general processing. The memory 802 may store data used by the processor 801 in a case of performing operations.

In an embodiment, the processor 801 may be a central processing unit (CPU), an application specific integrated circuit (ASIC), a field-programmable gate array (FPGA), or a complex programmable logic device (CPLD). The processor 801 may also adopt a multi-core architecture.

The processor 801 is used for calling the computer program in the memory 802 and executing any of the method provided by the embodiments in the application according to obtained executable instructions. For example, the method includes:

for a physical uplink shared channel (PUSCH) carrying a multi-slot transport block (TB), in case that the PUSCH and a physical uplink control channel (PUCCH) overlap in at least one slot, determining resources required for UCI multiplexing on the PUSCH and an upper limit of resources used for UCI multiplexing on the PUSCH;

determining resources used for actual UCI transmission based on the resources required for UCI multiplexing on the PUSCH and the upper limit of resources used for UCI multiplexing on the PUSCH; and transmitting the UCI on the PUSCH based on the resources used for the actual UCI transmission.

In an embodiment, the determining the resources required for UCI multiplexing on the PUSCH includes any one of the followings:

determining the resources required for UCI multiplexing on the PUSCH based on resources for the PUSCH in one slot;

determining the resources required for UCI multiplexing on the PUSCH based on resources for the PUSCH in a nominal transmission; and determining the resources required for UCI multiplexing on the PUSCH based on resources for the PUSCH in multiple slots.

In an embodiment, the determining the resources required for UCI multiplexing on the PUSCH based on resources for the PUSCH in one slot includes:

determining the resources required for UCI multiplexing on the PUSCH based on the number of orthogonal frequency division multiplexing (OFDM) symbols of the PUSCH in one slot.

In an embodiment, the determining the resources required for UCI multiplexing on the PUSCH based on the number of OFDM symbols of the PUSCH in one slot includes:

determining the resources required for UCI multiplexing on the PUSCH based on a first formula or a second formula;

the first formula is $$R = \left\lceil (O_{UCI} + L_{UCI}) \times \beta_{offset}^{PUSCH} \times \sum_{l=0}^{N_{symb,\ slot}^{PUSCH}-1} M_{SC}^{UCI}(l) \middle/ \sum_{r=0}^{C_{UCI-SCH}-1} K_r \right\rceil$$

the second formula is $$R = \left\lceil (O_{UCI} + L_{UCI}) \times \beta_{offset}^{PUSCH} \times \sum_{l=0}^{N_{symb,\ slot}^{PUSCH}-1} M_{SC}^{UCI}(l) \middle/ \sum_{r=0}^{C_{UCI-SCH}-1} K_r / N \right\rceil$$

where R is the resources required for UCI multiplexing on the PUSCH, $O_{UCI}$ is the number of bits for UCI carried on the PUSCH, $L_{UCI}$ is the number of cyclic redundancy check (CRC) bits for the UCI, $\beta_{offset}^{PUSCH}$ is a beta offset between data and the UCI, $N_{symb,\ slot}^{PUSCH}$ is the number of OFDM symbols of the PUSCH in a first slot or is the maximum or minimum number of OFDM symbols in all the slots for PUSCH transmission, $M_{SC}^{UCI}(l)$ is the number of sub-carriers (SC) used for UCI transmission in OFDM symbol l, $C_{UCI-SCH}$ is the number of code blocks for uplink shared channel (UL-SCH) of the PUSCH transmission, $K_r$ is the r-th code block size for UL-SCH of the PUSCH transmission, N is the number of slots used for the PUSCH transmission.

In an embodiment, the determining the resources required for UCI multiplexing on the PUSCH based on resources for the PUSCH in a nominal transmission includes:

determining the resources required for UCI multiplexing on the PUSCH based on the number of OFDM symbols of the PUSCH in a nominal transmission without segmentation.

In an embodiment, the determining the resources required for UCI multiplexing on the PUSCH based on the number of OFDM symbols of the PUSCH in a nominal transmission without segmentation includes:

determining the resources required for UCI multiplexing on the PUSCH based on a third formula or a fourth formula;

the third formula is $$R = \left\lceil (O_{UCI} + L_{UCI}) \times \beta_{offset}^{PUSCH} \times \sum_{l=0}^{N_{symb,\ nominal}^{PUSCH}-1} M_{SC}^{UCI}(l) \middle/ \sum_{r=0}^{C_{UCI-SCH}-1} K_r \right\rceil$$

the fourth formula is $$R = \left\lceil (O_{UCI} + L_{UCI}) \times \beta_{offset}^{PUSCH} \times \sum_{l=0}^{N_{symb,\,norminal}^{PUSCH}-1} M_{SC}^{UCI}(l) \Big/ \sum_{r=0}^{C_{UCI\_SCH}-1} K_r / M \right\rceil$$

where R is the resources required for UCI multiplexing on the PUSCH, $O_{UCI}$ is the number of bits for UCI carried on the PUSCH, $L_{UCI}$ is the number of CRC bits for the UCI, $\beta_{offset}^{PUSCH}$ is a beta offset between data and the UCI, $N_{symb,\,norminal}^{PUSCH}$ is the number of OFDM symbols of the PUSCH in a nominal transmission, $M_{SC}^{UCI}(l)$ is the number of SCs that can be used for UCI transmission in OFDM symbol l, $C_{UCI\text{-}SCH}$ is the number of code blocks for UL-SCH of the PUSCH transmission, $K_r$ is the r-th code block size for UL-SCH of the PUSCH transmission, M is the number of nominal transmissions used for the PUSCH transmission.

In an embodiment, the determining the resources required for UCI multiplexing on the PUSCH based on resources for the PUSCH in multiple slots includes:
determining the resources required for UCI multiplexing on the PUSCH based on the number of OFDM symbols in the multiple slots where the PUSCH transmits one TB.

In an embodiment, the determining the resources required for UCI multiplexing on the PUSCH based on the number of OFDM symbols in the multiple slots where the PUSCH transmits one TB includes:
determining the resources required for UCI multiplexing on the PUSCH based on a fifth formula;
the fifth formula is $$R = \left\lceil (O_{UCI} + L_{UCI}) \times \beta_{offset}^{PUSCH} \times \sum_{l=0}^{N_{symb,\,total}^{PUSCH}-1} M_{SC}^{UCI}(l) \Big/ \sum_{r=0}^{C_{UCI\_SCH}-1} K_r \right\rceil$$

where R is the resources required for UCI multiplexing on the PUSCH, $O_{UCI}$ is the number of bits for UCI carried on the PUSCH, $L_{UCI}$ is the number of CRC bits for the UCI, $\beta_{offset}^{PUSCH}$ is a beta offset between data and the UCI, $N_{symb,\,total}^{PUSCH}$ is the Total Number of OFDM symbols of the PUSCH, $M_{SC}^{UCI}(l)$ is the number of SCs that can be used for UCI transmission in OFDM symbol l, $C_{UCI\text{-}SCH}$ is the number of code blocks for UL-SCH of the PUSCH transmission, $K_r$ is the r-th code block size for UL-SCH of the PUSCH transmission.

In an embodiment, the determining the upper limit of resources used for UCI multiplexing on the PUSCH includes:
determining the upper limit of resources used for UCI multiplexing on the PUSCH based on resources for PUSCH overlapping with the PUCCH.

In an embodiment, the determining the upper limit of resources used for UCI multiplexing on the PUSCH based on resources for PUSCH overlapping with the PUCCH includes any one of the followings:
determining the upper limit of resources used for UCI multiplexing on the PUSCH based on the number of OFDM symbols overlapping with the PUCCH;
determining the upper limit of resources used for UCI multiplexing on the PUSCH based on the number of OFDM symbols of the PUSCH in a slot where the PUCCH and the PUSCH overlap; and
in case that the PUSCH is segmented in a slot, determining the upper limit of resources used for UCI multiplexing on the PUSCH based on the number of symbols of actual PUSCH overlapping with the PUCCH.

In an embodiment, where the determining the upper limit of resources used for UCI multiplexing on the PUSCH based on the number of OFDM symbols overlapping with the PUCCH includes:
determining the upper limit of resources used for UCI multiplexing on the PUSCH based on a sixth formula; or
determining a smaller value of a value obtained by a seventh formula and a value obtained by an eighth formula to be the upper limit of resources used for UCI multiplexing on the PUSCH;
the sixth formula is $$T = \left\lceil \alpha \times \sum_{l=l_0}^{N_{symb,\,overlap}^{PUSCH}-1} M_{sc}^{UCI}(l) \right\rceil$$

the seventh formula is $$T = \left\lceil \alpha \times \sum_{l=l_0}^{N_{symb,\,total}^{PUSCH}-1} M_{SC}^{UCI}(l) \right\rceil$$

the eighth formula is $$T = \left\lceil \sum_{l=l_0}^{N_{symb,\,total}^{PUSCH}-1} M_{SC}^{UCI}(l) \right\rceil$$

where T is the upper limit of resources used for UCI multiplexing on the PUSCH, α is a coefficient for upper limit of resources, $N_{symb,\,overlap}^{PUSCH}$ is the number of symbols that conflict with the PUCCH among the symbols of the PUSCH, $l_0$ is an OFDM symbol index of a symbol where the UCI mapping starts among the symbols of the PUSCH, $M_{SC}^{UCI}(l)$ is the number of SCs that can be used for UCI transmission in OFDM symbol l, $N_{symb,\,total}^{PUSCH}$ is the total number of OFDM symbols of the PUSCH.

In an embodiment, where the determining the upper limit of resources used for UCI multiplexing on the PUSCH based on the number of OFDM symbols of the PUSCH in the slot where the PUCCH and the PUSCH overlap includes:
determining the upper limit of resources used for UCI multiplexing on the PUSCH based on a ninth formula; or
determining a smaller value of a value obtained by a tenth formula and a value obtained by an eleventh formula to be the upper limit of resources used for UCI multiplexing on the PUSCH;

the ninth formula is $$T = \left| \alpha \times \sum_{l=l_0}^{N_{symb,\ total}^{PUSCH}-1} M_{SC}^{UCI}(l) \right|$$

the tenth formula is $$T = \left| \alpha \times \sum_{l=l_0}^{N_{symb,\ total}^{PUSCH}-1} M_{SC}^{UCI}(l) \right|$$

the eleventh formula is $$T = \left[ \sum_{l=l_0}^{N_{symb,\ total}^{PUSCH}-1} M_{SC}^{UCI}(l) \right]$$

where T is the upper limit of resources used for UCI multiplexing on the PUSCH, α is a coefficient for upper limit of resources, $N_{symb,\ slotoverlap}^{PUSCH}$ is the number of OFDM symbols of the PUSCH in at least one slot where the PUSCH transmission overlaps with the PUCCH, $l_0$ is an OFDM symbol index where the UCI mapping starts among the symbols of the PUSCH, $M_{SC}^{UCI}(l)$ is the number of SCs that can be used for UCI transmission in OFDM symbol l, $N_{symb,\ total}^{PUSCH}$ is the total number of OFDM symbols of the PUSCH.

In an embodiment, the determining the upper limit of resources used for UCI multiplexing on the PUSCH based on the number of symbols of actual PUSCH overlapping with the PUCCH includes:

determining the upper limit of resources used for UCI multiplexing on the PUSCH based on a twelfth formula; or determining a smaller value of a value obtained by a thirteenth formula and a value obtained by a fourteenth formula to be the upper limit of resources used for UCI multiplexing on the PUSCH;

the twelfth formula is $$T = \left| \alpha \times \sum_{l=l_0}^{N_{symb,\ total}^{PUSCH}-1} M_{SC}^{UCI}(l) \right|$$

the thirteenth formula is $$T = \left| \alpha \times \sum_{l=l_0}^{N_{symb,\ total}^{PUSCH}-1} M_{SC}^{UCI}(l) \right|$$

the fourteenth formula is $$T = \left| \alpha \times \sum_{l=l_0}^{N_{symb,\ total}^{PUSCH}-1} M_{SC}^{UCI}(l) \right|$$

where T is the upper limit of resources used for UCI multiplexing on the PUSCH, α is a coefficient for upper limit of resources, $N_{symb,\ total}^{PUSCH}$ is the total number of OFDM symbols of the PUSCH, $l_0$ is an OFDM symbol index where the UCI mapping starts among the symbols of the PUSCH, $M_{SC}^{UCI}(l)$ is the number of SCs that can be used for UCI transmission in OFDM symbol l, $N_{symb,\ actual}^{PUSCH}$ is the number of OFDM symbols of at least one segmented PUSCH that overlaps with the PUCCH in case that the PUSCH is segmented for transmission.

In an embodiment, after determining the upper limit of resources used for UCI multiplexing on the PUSCH, further including:

in case that a first UCI and a second UCI other than the UCI are multiplexed on the PUSCH, obtaining an upper limit of resources used for first UCI multiplexing on the PUSCH by subtracting resources used for the actual UCI transmission from the upper limit of resources used for UCI multiplexing on the PUSCH; and obtaining an upper limit of resources used for second UCI multiplexing on the PUSCH by subtracting resources used for the actual UCI transmission and actual first UCI transmission from the upper limit of resources used for UCI multiplexing on the PUSCH.

In an embodiment, the determining the resources used for actual UCI transmission based on the resources required for UCI multiplexing on the PUSCH and the upper limit of resources used for UCI multiplexing on the PUSCH includes:

determining a smaller value between the resources required for UCI multiplexing on the PUSCH and the upper limit of resources used for UCI multiplexing on the PUSCH to be the resources used for actual UCI transmission.

Figure 9:
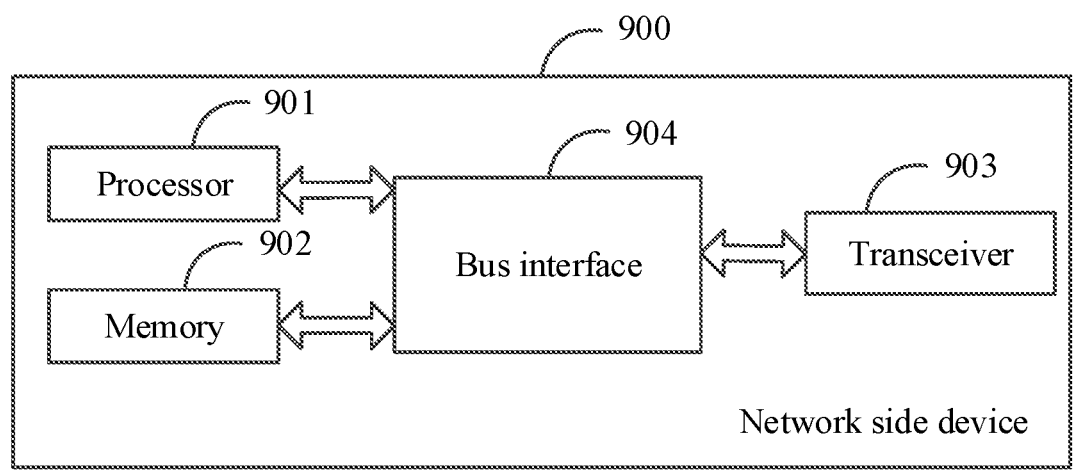
FIG. 9 is a schematic structural diagram of a network side device according to an embodiment of the present application.

FIG. 9 is a schematic structural diagram of a network side device according to an embodiment of the present application. As shown in FIG. 9, a network side device 900 includes a memory 902, a transceiver 903 and a processor 901; where, the processor 901 and the memory 902 may also be physically separated.

The memory 902 is used for storing computer programs; the transceiver 903 is used for receiving and transmitting data under a control of the processor 901.

In FIG. 9, a bus system 904 may include any number of interconnected buses and bridges, linked together by various circuits of one or more processors represented by processor 901 and circuits of memories represented by memory 902. The bus system 904 may also link various other circuits such as peripheral devices, regulators and power management circuits. The bus interface provides an interface. The transceiver 903 may be multiple components, that is, including a transmitter and a receiver, providing units for communication with various other devices on transmission media such as wireless channels, wired channels, optical fibers, etc. The processor 901 is used for managing the bus architecture and general processing. The memory 902 may store data used by the processor 901 in a case of performing operations.

In an embodiment, the processor 901 may be a central processing unit (CPU), an application specific integrated circuit (ASIC), a field-programmable gate array (FPGA), or a complex programmable logic device (CPLD). The processor 901 may also adopt a multi-core architecture.

The processor 901 is used for calling the computer program in the memory 902 and executing any of the method provided by the embodiments in the application according to obtained executable instructions. For example, the method includes:

for a physical uplink shared channel (PUSCH) carrying a multi-slot transport block (TB), in case that the PUSCH and a physical uplink control channel (PUCCH) overlap in at least one slot, determining resources required for UCI multiplexing on the PUSCH and an upper limit of resources used for UCI multiplexing on the PUSCH;

determining resources used for actual UCI transmission based on the resources required for UCI multiplexing on the PUSCH and the upper limit of resources used for UCI multiplexing on the PUSCH; and receiving the UCI on the PUSCH based on the resources used for the actual UCI transmission.

In an embodiment, the determining the resources required for UCI multiplexing on the PUSCH includes any one of the followings:

determining the resources required for UCI multiplexing on the PUSCH based on resources for the PUSCH in one slot;

determining the resources required for UCI multiplexing on the PUSCH based on resources for the PUSCH in a nominal transmission; and determining the resources required for UCI multiplexing on the PUSCH based on resources for the PUSCH in multiple slots.

In an embodiment, the determining the resources required for UCI multiplexing on the PUSCH based on resources for the PUSCH in one slot includes:

determining the resources required for UCI multiplexing on the PUSCH based on the number of orthogonal frequency division multiplexing (OFDM) symbols of the PUSCH in one slot.

In an embodiment, the determining the resources required for UCI multiplexing on the PUSCH based on the number of OFDM symbols of the PUSCH in one slot includes:

determining the resources required for UCI multiplexing on the PUSCH based on a first formula or a second formula;

the first formula is $$R = \left\lceil (O_{UCI} + L_{UCI}) \times \beta_{offset}^{PUSCH} \times \frac{\sum_{l=0}^{N_{symb,slot}^{PUSCH}-1} M_{SC}^{UCI}(l)}{\sum_{r=0}^{C_{UCI-SCH}-1} K_r} \right\rceil$$

the second formula is $$R = \left\lceil (O_{UCI} + L_{UCI}) \times \beta_{offset}^{PUSCH} \times \frac{\sum_{l=0}^{N_{symb,slot}^{PUSCH}-1} M_{SC}^{UCI}(l)}{\sum_{r=0}^{C_{UCI-SCH}-1} K_r / N} \right\rceil$$

where R is the resources required for UCI multiplexing on the PUSCH, $O_{UCI}$ is the number of bits for UCI carried on the PUSCH, $L_{UCI}$ is the number of cyclic redundancy check (CRC) bits for the UCI, $\beta_{offset}^{PUSCH}$ is a beta offset between data and the UCI, $N_{symb,slot}^{PUSCH}$ is the number of OFDM symbols of the PUSCH in a first slot or is the maximum or minimum number of OFDM symbols in all the slots for PUSCH transmission, $M_{SC}^{UCI}(l)$ is the number of sub-carriers (SC) used for UCI transmission in OFDM symbol l, $C_{UCI-SCH}$ is the number of code blocks for uplink shared channel (UL-SCH) of the PUSCH transmission, $K_r$ is the r-th code block size for UL-SCH of the PUSCH transmission, N is the number of slots used for the PUSCH transmission.

In an embodiment, the determining the resources required for UCI multiplexing on the PUSCH based on resources for the PUSCH in a nominal transmission includes:

determining the resources required for UCI multiplexing on the PUSCH based on the number of OFDM symbols of the PUSCH in a nominal transmission without segmentation.

In an embodiment, the determining the resources required for UCI multiplexing on the PUSCH based on the number of OFDM symbols of the PUSCH in a nominal transmission without segmentation includes:

determining the resources required for UCI multiplexing on the PUSCH based on a third formula or a fourth formula;

the third formula is $$R = \left\lceil (O_{UCI} + L_{UCI}) \times \beta_{offset}^{PUSCH} \times \frac{\sum_{l=0}^{N_{symb,nominal}^{PUSCH}-1} M_{SC}^{UCI}(l)}{\sum_{r=0}^{C_{UCI-SCH}-1} K_r} \right\rceil$$

the fourth formula is $$R = \left\lceil (O_{UCI} + L_{UCI}) \times \beta_{offset}^{PUSCH} \times \frac{\sum_{l=0}^{N_{symb,nominal}^{PUSCH}-1} M_{SC}^{UCI}(l)}{\sum_{r=0}^{C_{UCI-SCH}-1} K_r / M} \right\rceil$$

where R is the resources required for UCI multiplexing on the PUSCH, $O_{UCI}$ is the number of bits for UCI carried on the PUSCH, $L_{UCI}$ is the number of CRC bits for the UCI, $\beta_{offset}^{PUSCH}$ is a beta offset between data and the UCI, $N_{symb,nominal}^{PUSCH}$ is the number of OFDM symbols of the PUSCH in a nominal transmission, $M_{SC}^{UCI}(l)$ is the number of SCs that can be used for UCI transmission in OFDM symbol l, $C_{UCI-SCH}$ is the number of code blocks for UL-SCH of the PUSCH transmission, $K_r$ is the r-th code block size for UL-SCH of the PUSCH transmission, M is the number of nominal transmissions used for the PUSCH transmission.

In an embodiment, the determining the resources required for UCI multiplexing on the PUSCH based on resources for the PUSCH in multiple slots includes:

determining the resources required for UCI multiplexing on the PUSCH based on the number of OFDM symbols in the multiple slots where the PUSCH transmits one TB.

In an embodiment, the determining the resources required for UCI multiplexing on the PUSCH based on the number of OFDM symbols in the multiple slots where the PUSCH transmits one TB includes:

determining the resources required for UCI multiplexing on the PUSCH based on a fifth formula;

the fifth formula is $$R = \left\lceil (O_{UCI} + L_{UCI}) \times \beta_{offset}^{PUSCH} \times \frac{\sum_{l=0}^{N_{symb,total}^{PUSCH}-1} M_{SC}^{UCI}(l)}{\sum_{r=0}^{C_{UCI-SCH}-1} K_r} \right\rceil$$

where R is the resources required for UCI multiplexing on the PUSCH, $O_{UCI}$ is the number of bits for UCI carried on the PUSCH, $L_{UCI}$ is the number of CRC bits for the UCI, $\beta_{offset}^{PUSCH}$ is a beta offset between data and the UCI, $N_{symb,\,total}^{PUSCH}$ is the total number of OFDM symbols of the PUSCH, $M_{SC}^{UCI}(l)$ is the number of SCs that can be used for UCI transmission in OFDM symbol l, $C_{UCI-SCH}$ is the number of code blocks for UL-SCH of the PUSCH transmission, $K_r$ is the r-th code block size for UL-SCH of the PUSCH transmission.

In an embodiment, the determining the upper limit of resources used for UCI multiplexing on the PUSCH includes:
determining the upper limit of resources used for UCI multiplexing on the PUSCH based on resources for PUSCH overlapping with the PUCCH.

In an embodiment, the determining the upper limit of resources used for UCI multiplexing on the PUSCH based on resources for PUSCH overlapping with the PUCCH includes any one of the followings:
determining the upper limit of resources used for UCI multiplexing on the PUSCH based on the number of OFDM symbols overlapping with the PUCCH;
determining the upper limit of resources used for UCI multiplexing on the PUSCH based on the number of OFDM symbols of the PUSCH in a slot where the PUCCH and the PUSCH overlap; and
in case that the PUSCH is segmented in a slot, determining the upper limit of resources used for UCI multiplexing on the PUSCH based on the number of symbols of actual PUSCH overlapping with the PUCCH.

In an embodiment, the determining the upper limit of resources used for UCI multiplexing on the PUSCH based on the number of OFDM symbols overlapping with the PUCCH includes:
determining the upper limit of resources used for UCI multiplexing on the PUSCH based on a sixth formula; or
determining a smaller value of a value obtained by a seventh formula and a value obtained by an eighth formula to be the upper limit of resources used for UCI multiplexing on the PUSCH;
the sixth formula is $$T = \left\lceil \alpha \times \sum_{l=l_0}^{N_{symb,\,overlap}^{PUSCH}-1} M_{sc}^{UCI}(l) \right\rceil$$

the seventh formula is $$T = \left\lceil \alpha \times \sum_{l=l_0}^{N_{symb,total}^{PUSCH}-1} M_{SC}^{UCI}(l) \right\rceil$$

the eighth formula is $$T = \left\lceil \sum_{l=l_0}^{N_{symb,overlap}^{PUSCH}-1} M_{SC}^{UCI}(l) \right\rceil$$

where T is the upper limit of resources used for UCI multiplexing on the PUSCH, $\alpha$ is a coefficient for upper limit of resources, $N_{symb,\,overlap}^{PUSCH}$ is the number of symbols that conflict with the PUCCH among the symbols of the PUSCH, $l_0$ is an OFDM symbol index of a symbol where the UCI mapping starts among the symbols of the PUSCH, $M_{SC}^{UCI}(l)$ is the number of SCs that can be used for UCI transmission in OFDM symbol l, $N_{symb,\,total}^{PUSCH}$ is the total number of OFDM symbols of the PUSCH.

In an embodiment, the determining the upper limit of resources used for UCI multiplexing on the PUSCH based on the number of OFDM symbols of the PUSCH in the slot where the PUCCH and the PUSCH overlap includes:
determining the upper limit of resources used for UCI multiplexing on the PUSCH based on a ninth formula; or
determining a smaller value of a value obtained by a tenth formula and a value obtained by an eleventh formula to be the upper limit of resources used for UCI multiplexing on the PUSCH;
the ninth formula is $$T = \left\lceil \alpha \times \sum_{l=l_0}^{N_{symb,slotoverlap}^{PUSCH}-1} M_{SC}^{UCI}(l) \right\rceil$$

the tenth formula is $$T = \left\lceil \alpha \times \sum_{l=l_0}^{N_{symb,total}^{PUSCH}-1} M_{SC}^{UCI}(l) \right\rceil$$

the eleventh formula is $$T = \left\lceil \sum_{l=l_0}^{N_{symb,slotoverlap}^{PUSCH}-1} M_{SC}^{UCI}(l) \right\rceil$$

where T is the upper limit of resources used for UCI multiplexing on the PUSCH, $\alpha$ is a coefficient for upper limit of resources, $N_{symb,\,slotoverlap}^{PUSCH}$ is the number of OFDM symbols of the PUSCH in at least one slot where the PUSCH transmission overlaps with the PUCCH, $l_0$ is an OFDM symbol index where the UCI mapping starts among the symbols of the PUSCH, $M_{SC}^{UCI}(l)$ is the number of SCs that can be used for UCI transmission in OFDM symbol l, $N_{symb,\,total}^{PUSCH}$ is the total number of OFDM symbols of the PUSCH.

In an embodiment, the determining the upper limit of resources used for UCI multiplexing on the PUSCH based on the number of symbols of actual PUSCH overlapping with the PUCCH includes:
determining the upper limit of resources used for UCI multiplexing on the PUSCH based on a twelfth formula; or
determining a smaller value of a value obtained by a thirteenth formula and a value obtained by a fourteenth formula to be the upper limit of resources used for UCI multiplexing on the PUSCH;

the twelfth formula is $$T = \left\lceil \alpha \times \sum_{l=l_0}^{N_{symb,actual}^{PUSCH}-1} M_{SC}^{UCI}(l) \right\rceil$$

the thirteenth formula is $$T = \left\lceil \alpha \times \sum_{l=l_0}^{N_{symb,total}^{PUSCH}-1} M_{SC}^{UCI}(l) \right\rceil$$

the fourteenth formula is $$T = \left\lceil \sum_{l=l_0}^{N_{symb,actual}^{PUSCH}-1} M_{SC}^{UCI}(l) \right\rceil$$

where T is the upper limit of resources used for UCI multiplexing on the PUSCH, α is a coefficient for upper limit of resources, $N_{symb,\ total}^{PUSCH}$ is the total number of OFDM symbols of the PUSCH, $l_0$ is an OFDM symbol index where the UCI mapping starts among the symbols of the PUSCH, $M_{SC}^{UCI}(l)$ is the number of SCs that can be used for UCI transmission in OFDM symbol l, $N_{symb,\ actual}^{PUSCH}$ is the number of OFDM symbols of at least one segmented PUSCH that overlaps with the PUCCH in case that the PUSCH is segmented for transmission.

In an embodiment, after determining the upper limit of resources used for UCI multiplexing on the PUSCH, further including:

in case that a first UCI and a second UCI other than the UCI are multiplexed on the PUSCH, obtaining an upper limit of resources used for first UCI multiplexing on the PUSCH by subtracting resources used for the actual UCI transmission from the upper limit of resources used for UCI multiplexing on the PUSCH; and obtaining an upper limit of resources used for second UCI multiplexing on the PUSCH by subtracting resources used for the actual UCI transmission and actual first UCI transmission from the upper limit of resources used for UCI multiplexing on the PUSCH.

In an embodiment, the determining the resources used for actual UCI transmission based on the resources required for UCI multiplexing on the PUSCH and the upper limit of resources used for UCI multiplexing on the PUSCH includes:

determining a smaller value between the resources required for UCI multiplexing on the PUSCH and the upper limit of resources used for UCI multiplexing on the PUSCH to be the resources used for actual UCI transmission.

It should be noted that, the terminal and the network side device in the embodiments of the application can implement all the methods provided by the above method embodiments and achieve the same technical effects. The same parts and beneficial effects as the method embodiments are not repeated.

Figure 10:
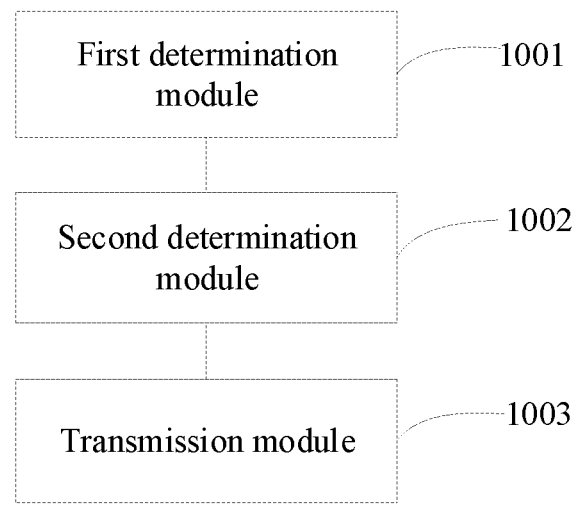
FIG. 10 is a schematic block diagram of a UCI multiplexing apparatus applied to a terminal according to an embodiment of the present application.

FIG. 10 is a schematic block diagram of a UCI multiplexing apparatus applied to a terminal according to an embodiment of the present application. For a physical uplink shared channel (PUSCH) carrying a multi-slot transport block (TB), in case that the PUSCH and a physical uplink control channel (PUCCH) overlap in at least one slot, the UCI multiplexing apparatus applied to the terminal includes:

a first determination module 1001, used for determining resources required for UCI multiplexing on the PUSCH and an upper limit of resources used for UCI multiplexing on the PUSCH;

a second determination module 1002, used for determining resources used for actual UCI transmission based on the resources required for UCI multiplexing on the PUSCH and the upper limit of resources used for UCI multiplexing on the PUSCH; and a transmission module 1003, used foe transmitting the UCI on the PUSCH based on the resources used for the actual UCI transmission.

In an embodiment, the determining the resources required for UCI multiplexing on the PUSCH includes any one of the followings:

determining the resources required for UCI multiplexing on the PUSCH based on resources for the PUSCH in one slot;

determining the resources required for UCI multiplexing on the PUSCH based on resources for the PUSCH in a nominal transmission; and determining the resources required for UCI multiplexing on the PUSCH based on resources for the PUSCH in multiple slots.

In an embodiment, the determining the resources required for UCI multiplexing on the PUSCH based on resources for the PUSCH in one slot includes:

determining the resources required for UCI multiplexing on the PUSCH based on the number of orthogonal frequency division multiplexing (OFDM) symbols of the PUSCH in one slot.

In an embodiment, the determining the resources required for UCI multiplexing on the PUSCH based on the number of OFDM symbols of the PUSCH in one slot includes:

determining the resources required for UCI multiplexing on the PUSCH based on a first formula or a second formula;

the first formula is $$R = \left\lceil (O_{UCI} + L_{UCI}) \times \beta_{offset}^{PUSCH} \times \sum_{l=0}^{N_{symb,slot}^{PUSCH}-1} M_{SC}^{UCI}(l) \middle/ \sum_{r=0}^{C_{UCI-SCH}-1} K_r \right\rceil$$

the second formula is $$R = \left\lceil (O_{UCI} + L_{UCI}) \times \beta_{offset}^{PUSCH} \times \sum_{l=0}^{N_{symb,slot}^{PUSCH}-1} M_{SC}^{UCI}(l) \middle/ \sum_{r=0}^{C_{UCI-SCH}-1} K_r/N \right\rceil$$

where R is the resources required for UCI multiplexing on the PUSCH, $O_{UCI}$ is the number of bits for UCI carried on the PUSCH, $L_{UCI}$ is the number of cyclic redundancy check (CRC) bits for the UCI, $\beta_{offset}^{PUSCH}$ is a beta offset between data and the UCI, $N_{symb,\ slot}^{PUSCH}$ is the number of OFDM symbols of the PUSCH in a first slot or is the maximum or minimum number of OFDM symbols in all the slots for PUSCH transmission, $M_{SC}^{UCI}(l)$ is the number of sub-carriers (SC) used for UCI transmission in OFDM symbol l, $C_{UCI-SCH}$ is the number of code blocks for uplink shared channel (UL-SCH) of the PUSCH transmission, $K_r$ is the r-th code block size for UL-SCH of the PUSCH transmission, N is the number of slots used for the PUSCH transmission.

In an embodiment, the determining the resources required for UCI multiplexing on the PUSCH based on resources for the PUSCH in a nominal transmission includes:
  determining the resources required for UCI multiplexing on the PUSCH based on the number of OFDM symbols of the PUSCH in a nominal transmission without segmentation.

In an embodiment, the determining the resources required for UCI multiplexing on the PUSCH based on the number of OFDM symbols of the PUSCH in a nominal transmission without segmentation includes:
  determining the resources required for UCI multiplexing on the PUSCH based on a third formula or a fourth formula;
  the third formula is $$R = \left\lceil (O_{UCI} + L_{UCI}) \times \beta_{offset}^{PUSCH} \times \frac{\sum_{l=0}^{N_{symb,norminal}^{PUSCH}-1} M_{SC}^{UCI}(l)}{\sum_{r=0}^{C_{UCI-SCH}-1} K_r} \right\rceil$$

the fourth formula is $$R = \left\lceil (O_{UCI} + L_{UCI}) \times \beta_{offset}^{PUSCH} \times \frac{\sum_{l=0}^{N_{symb,norminal}^{PUSCH}-1} M_{SC}^{UCI}(l)}{\sum_{r=0}^{C_{UCI-SCH}-1} K_r/M} \right\rceil$$

where R is the resources required for UCI multiplexing on the PUSCH, $O_{UCI}$ is the number of bits for UCI carried on the PUSCH, $L_{UCI}$ is the number of CRC bits for the UCI, $\beta_{offset}^{PUSCH}$ is a beta offset between data and the UCI, $N_{symb,\,norminal}^{PUSCH}$ is the number of OFDM symbols of the PUSCH in a nominal transmission, $M_{SC}^{UCI}(l)$ is the number of SCs that can be used for UCI transmission in OFDM symbol l, $C_{UCI-SCH}$ is the number of code blocks for UL-SCH of the PUSCH transmission, $K_r$ is the r-th code block size for UL-SCH of the PUSCH transmission, M is the number of nominal transmissions used for the PUSCH transmission.

In an embodiment, the determining the resources required for UCI multiplexing on the PUSCH based on resources for the PUSCH in multiple slots includes:
  determining the resources required for UCI multiplexing on the PUSCH based on the number of OFDM symbols in the multiple slots where the PUSCH transmits one TB.

In an embodiment, the determining the resources required for UCI multiplexing on the PUSCH based on the number of OFDM symbols in the multiple slots where the PUSCH transmits one TB includes:
  determining the resources required for UCI multiplexing on the PUSCH based on a fifth formula;
  the fifth formula is $$R = \left\lceil (O_{UCI} + L_{UCI}) \times \beta_{offset}^{PUSCH} \times \frac{\sum_{l=0}^{N_{symb,total}^{PUSCH}-1} M_{SC}^{UCI}(l)}{\sum_{r=0}^{C_{UCI-SCH}-1} K_r} \right\rceil$$

where R is the resources required for UCI multiplexing on the PUSCH, $O_{UCI}$ is the number of bits for UCI carried on the PUSCH, $L_{UCI}$ is the number of CRC bits for the UCI, $\beta_{offset}^{PUSCH}$ is a beta offset between data and the UCI, $N_{symb,\,total}^{PUSCH}$ is the total number of OFDM symbols of the PUSCH, $M_{SC}^{UCI}(l)$ is the number of SCs that can be used for UCI transmission in OFDM symbol l, $C_{UCI-SCH}$ is the number of code blocks for UL-SCH of the PUSCH transmission, $K_r$ is the r-th code block size for UL-SCH of the PUSCH transmission.

In an embodiment, the determining the upper limit of resources used for UCI multiplexing on the PUSCH includes:
  determining the upper limit of resources used for UCI multiplexing on the PUSCH based on resources for PUSCH overlapping with the PUCCH.

In an embodiment, the determining the upper limit of resources used for UCI multiplexing on the PUSCH based on resources for PUSCH overlapping with the PUCCH includes any one of the followings:
  determining the upper limit of resources used for UCI multiplexing on the PUSCH based on the number of OFDM symbols overlapping with the PUCCH;
  determining the upper limit of resources used for UCI multiplexing on the PUSCH based on the number of OFDM symbols of the PUSCH in a slot where the PUCCH and the PUSCH overlap; and
  in case that the PUSCH is segmented in a slot, determining the upper limit of resources used for UCI multiplexing on the PUSCH based on the number of symbols of actual PUSCH overlapping with the PUCCH.

In an embodiment, where the determining the upper limit of resources used for UCI multiplexing on the PUSCH based on the number of OFDM symbols overlapping with the PUCCH includes:
  determining the upper limit of resources used for UCI multiplexing on the PUSCH based on a sixth formula; or
  determining a smaller value of a value obtained by a seventh formula and a value obtained by an eighth formula to be the upper limit of resources used for UCI multiplexing on the PUSCH;
  the sixth formula is $$T = \left\lceil \alpha \times \sum_{l=l_0}^{N_{symb,overlap}^{PUSCH}-1} M_{SC}^{UCI}(l) \right\rceil$$

the seventh formula is $$T = \left\lceil \alpha \times \sum_{l=l_0}^{N_{symb,total}^{PUSCH}-1} M_{SC}^{UCI}(l) \right\rceil$$

the eighth formula is $$T = \left\lceil \sum_{l=l_0}^{N_{symb,overlap}^{PUSCH}-1} M_{SC}^{UCI}(l) \right\rceil$$

where T is the upper limit of resources used for UCI multiplexing on the PUSCH, α is a coefficient for upper limit of resources, $N_{symb,\ overlap}^{PUSCH}$ is the number of symbols that conflict with the PUCCH among the symbols of the PUSCH, $l_0$ is an OFDM symbol index of a symbol where the UCI mapping starts among the symbols of the PUSCH, $M_{SC}^{UCI}(l)$ is the number of SCs that can be used for UCI transmission in OFDM symbol l, $N_{symb,\ total}^{PUSCH}$ is the total number of OFDM symbols of the PUSCH.

In an embodiment, where the determining the upper limit of resources used for UCI multiplexing on the PUSCH based on the number of OFDM symbols of the PUSCH in the slot where the PUCCH and the PUSCH overlap includes:
determining the upper limit of resources used for UCI multiplexing on the PUSCH based on a ninth formula; or
determining a smaller value of a value obtained by a tenth formula and a value obtained by an eleventh formula to be the upper limit of resources used for UCI multiplexing on the PUSCH;
the ninth formula is $$T = \left\lfloor \alpha \times \sum_{l=l_0}^{N_{symb,slotoverlap}^{PUSCH}-1} M_{SC}^{UCI}(l) \right\rfloor$$

the tenth formula is $$T = \left\lfloor \alpha \times \sum_{l=l_0}^{N_{symb,total}^{PUSCH}-1} M_{SC}^{UCI}(l) \right\rfloor$$

the eleventh formula is $$T = \left\lfloor \sum_{l=l_0}^{N_{symb,slotoverlap}^{PUSCH}-1} M_{SC}^{UCI}(l) \right\rfloor$$

where T is the upper limit of resources used for UCI multiplexing on the PUSCH, α is a coefficient for upper limit of resources, $N_{symb,\ slotoverlap}^{PUSCH}$ is the number of OFDM symbols of the PUSCH in at least one slot where the PUSCH transmission overlaps with the PUCCH, $l_0$ is an OFDM symbol index where the UCI mapping starts among the symbols of the PUSCH, $M_{SC}^{UCI}(l)$ is the number of SCs that can be used for UCI transmission in OFDM symbol l, $N_{symb,\ total}^{PUSCH}$ is the total number of OFDM symbols of the PUSCH.

In an embodiment, the determining the upper limit of resources used for UCI multiplexing on the PUSCH based on the number of symbols of actual PUSCH overlapping with the PUCCH includes:
determining the upper limit of resources used for UCI multiplexing on the PUSCH based on a twelfth formula; or
determining a smaller value of a value obtained by a thirteenth formula and a value obtained by a fourteenth formula to be the upper limit of resources used for UCI multiplexing on the PUSCH;

the twelfth formula is $$T = \left\lfloor \alpha \times \sum_{l=l_0}^{N_{symb,actual}^{PUSCH}-1} M_{SC}^{UCI}(l) \right\rfloor$$

the thirteenth formula is $$T = \left\lfloor \alpha \times \sum_{l=l_0}^{N_{symb,total}^{PUSCH}-1} M_{SC}^{UCI}(l) \right\rfloor$$

the fourteenth formula is $$T = \left\lfloor \sum_{l=l_0}^{N_{symb,actual}^{PUSCH}-1} M_{SC}^{UCI}(l) \right\rfloor$$

where T is the upper limit of resources used for UCI multiplexing on the PUSCH, α is a coefficient for upper limit of resources, $N_{symb,\ total}^{PUSCH}$ is the total number of OFDM symbols of the PUSCH, $l_0$ is an OFDM symbol index where the UCI mapping starts among the symbols of the PUSCH, $M_{SC}^{UCI}(l)$ is the number of SCs that can be used for UCI transmission in OFDM symbol l, $N_{symb,\ actual}^{PUSCH}$ is the number of OFDM symbols u of at least one segmented PUSCH that overlaps with the PUCCH in case that the PUSCH is segmented for transmission.

In an embodiment, after determining the upper limit of resources used for UCI multiplexing on the PUSCH, further including:
in case that a first UCI and a second UCI other than the UCI are multiplexed on the PUSCH, obtaining an upper limit of resources used for first UCI multiplexing on the PUSCH by subtracting resources used for the actual UCI transmission from the upper limit of resources used for UCI multiplexing on the PUSCH; and
obtaining an upper limit of resources used for second UCI multiplexing on the PUSCH by subtracting resources used for the actual UCI transmission and actual first UCI transmission from the upper limit of resources used for UCI multiplexing on the PUSCH.

In an embodiment, the determining the resources used for actual UCI transmission based on the resources required for UCI multiplexing on the PUSCH and the upper limit of resources used for UCI multiplexing on the PUSCH includes:
determining a smaller value between the resources required for UCI multiplexing on the PUSCH and the upper limit of resources used for UCI multiplexing on the PUSCH to be the resources used for actual UCI transmission.

Figure 11:
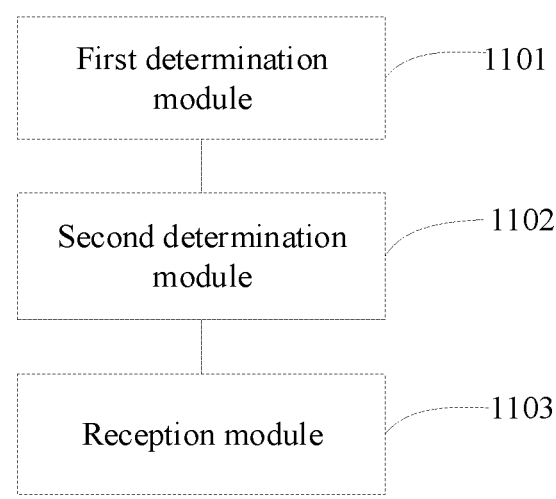
FIG. 11 is a schematic block diagram of a UCI multiplexing apparatus applied to a network side device according to an embodiment of the present application.

FIG. 11 is a schematic block diagram of a UCI multiplexing apparatus applied to a network side device according to an embodiment of the present application. For a physical uplink shared channel (PUSCH) carrying a multi-slot transport block (TB), in case that the PUSCH and a physical uplink control channel (PUCCH) overlap in at least one slot, the UCI multiplexing apparatus applied to the network side device includes: a first determination module 1101, used for determining resources required for UCI multiplexing on the PUSCH and an upper limit of resources used for UCI multiplexing on the PUSCH;

a second determination module 1102, used for determining resources used for actual UCI transmission based on the resources required for UCI multiplexing on the PUSCH and the upper limit of resources used for UCI multiplexing on the PUSCH; and a reception module 1103, used for receiving the UCI on the PUSCH based on the resources used for the actual UCI transmission.

In an embodiment, the determining the resources required for UCI multiplexing on the PUSCH includes any one of the followings:

determining the resources required for UCI multiplexing on the PUSCH based on resources for the PUSCH in one slot;

determining the resources required for UCI multiplexing on the PUSCH based on resources for the PUSCH in a nominal transmission; and determining the resources required for UCI multiplexing on the PUSCH based on resources for the PUSCH in multiple slots.

In an embodiment, the determining the resources required for UCI multiplexing on the PUSCH based on resources for the PUSCH in one slot includes:

determining the resources required for UCI multiplexing on the PUSCH based on the number of orthogonal frequency division multiplexing (OFDM) symbols of the PUSCH in one slot.

In an embodiment, the determining the resources required for UCI multiplexing on the PUSCH based on the number of OFDM symbols of the PUSCH in one slot includes:

determining the resources required for UCI multiplexing on the PUSCH based on a first formula or a second formula;

the first formula is $$R = \left\lceil (O_{UCI} + L_{UCI}) \times \beta_{offset}^{PUSCH} \times \frac{\sum_{l=0}^{N_{symb,slot}^{PUSCH}-1} M_{SC}^{UCI}(l)}{\sum_{r=0}^{C_{UCI-SCH}-1} K_r} \right\rceil$$

the second formula is $$R = \left\lceil (O_{UCI} + L_{UCI}) \times \beta_{offset}^{PUSCH} \times \frac{\sum_{l=0}^{N_{symb,slot}^{PUSCH}-1} M_{SC}^{UCI}(l)}{\sum_{r=0}^{C_{UCI-SCH}-1} K_r/N} \right\rceil$$

where R is the resources required for UCI multiplexing on the PUSCH, $O_{UCI}$ is the number of bits for UCI carried on the PUSCH, $L_{UCI}$ is the number of cyclic redundancy check (CRC) bits for the UCI, $\beta_{offset}^{PUSCH}$ is a beta offset between data and the UCI, $N_{symb,\ slot}^{PUSCH}$ is the number of OFDM symbols of the PUSCH in a first slot or is the maximum or minimum number of OFDM symbols in all the slots for PUSCH transmission, $M_{SC}^{UCI}(l)$ is the number of sub-carriers (SC) used for UCI transmission in OFDM symbol l, $C_{UCI-SCH}$ is the number of code blocks for uplink shared channel (UL-SCH) of the PUSCH transmission, $K_r$ is the r-th code block size for UL-SCH of the PUSCH transmission, N is the number of slots used for the PUSCH transmission.

In an embodiment, the determining the resources required for UCI multiplexing on the PUSCH based on resources for the PUSCH in a nominal transmission includes:

determining the resources required for UCI multiplexing on the PUSCH based on the number of OFDM symbols of the PUSCH in a nominal transmission without segmentation.

In an embodiment, the determining the resources required for UCI multiplexing on the PUSCH based on the number of OFDM symbols of the PUSCH in a nominal transmission without segmentation includes:

determining the resources required for UCI multiplexing on the PUSCH based on a third formula or a fourth formula;

the third formula is $$R = \left\lceil (O_{UCI} + L_{UCI}) \times \beta_{offset}^{PUSCH} \times \frac{\sum_{l=0}^{N_{symb,norminal}^{PUSCH}-1} M_{SC}^{UCI}(l)}{\sum_{r=0}^{C_{UCI-SCH}-1} K_r} \right\rceil$$

the fourth formula is $$R = \left\lceil (O_{UCI} + L_{UCI}) \times \beta_{offset}^{PUSCH} \times \frac{\sum_{l=0}^{N_{symb,norminal}^{PUSCH}-1} M_{SC}^{UCI}(l)}{\sum_{r=0}^{C_{UCI-SCH}-1} K_r/M} \right\rceil$$

where R is the resources required for UCI multiplexing on the PUSCH, $O_{UCI}$ is the number of bits for UCI carried on the PUSCH, $L_{UCI}$ is the number of CRC bits for the UCI, $\beta_{offset}^{PUSCH}$ is a beta offset between data and the UCI, $N_{symb,\ norminal}^{PUSCH}$ is the number of OFDM symbols of the PUSCH in a nominal transmission, $M_{SC}^{UCI}(l)$ is the number of SCs that can be used for UCI transmission in OFDM symbol l, $C_{UCI-SCH}$ is the number of code blocks for UL-SCH of the PUSCH transmission, $K_r$ is the r-th code block size for UL-SCH of the PUSCH transmission, M is the number of nominal transmissions used for the PUSCH transmission.

In an embodiment, the determining the resources required for UCI multiplexing on the PUSCH based on resources for the PUSCH in multiple slots includes:

determining the resources required for UCI multiplexing on the PUSCH based on the number of OFDM symbols in the multiple slots where the PUSCH transmits one TB.

In an embodiment, the determining the resources required for UCI multiplexing on the PUSCH based on the number of OFDM symbols in the multiple slots where the PUSCH transmits one TB includes:

determining the resources required for UCI multiplexing on the PUSCH based on a fifth formula:

the fifth formula is $$R = \left\lceil (O_{UCI} + L_{UCI}) \times \beta_{offset}^{PUSCH} \times \frac{\sum_{l=0}^{N_{symb,total}^{PUSCH}-1} M_{SC}^{UCI}(l)}{\sum_{r=0}^{C_{UCI-SCH}-1} K_r} \right\rceil$$

where R is the resources required for UCI multiplexing on the PUSCH, $O_{UCI}$ is the number of bits for UCI carried on the PUSCH, $L_{UCI}$ is the number of CRC bits for the UCI, $\beta_{offset}^{PUSCH}$ is a beta offset between data and the UCI, $N_{symb,\ total}^{PUSCH}$ is the total number of OFDM symbols of the PUSCH, $M_{SC}^{UCI}(l)$ is the number of SCs that can be used for UCI transmission in OFDM symbol l, $C_{UCI\text{-}SCH}$ is the number of code blocks for UL-SCH of the PUSCH transmission, $K_r$ is the r-th code block size for UL-SCH of the PUSCH transmission.

In an embodiment, the determining the upper limit of resources used for UCI multiplexing on the PUSCH includes:

determining the upper limit of resources used for UCI multiplexing on the PUSCH based on resources for PUSCH overlapping with the PUCCH.

In an embodiment, the determining the upper limit of resources used for UCI multiplexing on the PUSCH based on resources for PUSCH overlapping with the PUCCH includes any one of the followings:

determining the upper limit of resources used for UCI multiplexing on the PUSCH based on the number of OFDM symbols overlapping with the PUCCH;

determining the upper limit of resources used for UCI multiplexing on the PUSCH based on the number of OFDM symbols of the PUSCH in a slot where the PUCCH and the PUSCH overlap; and in case that the PUSCH is segmented in a slot, determining the upper limit of resources used for UCI multiplexing on the PUSCH based on the number of symbols of actual PUSCH overlapping with the PUCCH.

In an embodiment, the determining the upper limit of resources used for UCI multiplexing on the PUSCH based on the number of OFDM symbols overlapping with the PUCCH includes:

determining the upper limit of resources used for UCI multiplexing on the PUSCH based on a sixth formula; or determining a smaller value of a value obtained by a seventh formula and a value obtained by an eighth formula to be the upper limit of resources used for UCI multiplexing on the PUSCH;

the sixth formula is $$T = \left\lceil \alpha \times \sum_{l=l_0}^{N_{symb,overlap}^{PUSCH}-1} M_{SC}^{UCI}(l) \right\rceil$$

the seventh formula is $$T = \left\lceil \alpha \times \sum_{l=l_0}^{N_{symb,total}^{PUSCH}-1} M_{SC}^{UCI}(l) \right\rceil$$

the eighth formula is $$T = \left\lceil \sum_{l=l_0}^{N_{symb,overlap}^{PUSCH}-1} M_{SC}^{UCI}(l) \right\rceil$$

where T is the upper limit of resources used for UCI multiplexing on the PUSCH, $\alpha$ is a coefficient for upper limit of resources, $N_{symb,\ overlap}^{PUSCH}$ is the number of symbols that conflict with the PUCCH among the symbols of the PUSCH, $l_0$ is an OFDM symbol index of a symbol where the UCI mapping starts among the symbols of the PUSCH, $M_{SC}^{UCI}(l)$ is the number of SCs that can be used for UCI transmission in OFDM symbol l, $N_{symb,\ total}^{PUSCH}$ is the total number of OFDM symbols of the PUSCH.

In an embodiment, the determining the upper limit of resources used for UCI multiplexing on the PUSCH based on the number of OFDM symbols of the PUSCH in the slot where the PUCCH and the PUSCH overlap includes:

determining the upper limit of resources used for UCI multiplexing on the PUSCH based on a ninth formula; or determining a smaller value of a value obtained by a tenth formula and a value obtained by an eleventh formula to be the upper limit of resources used for UCI multiplexing on the PUSCH;

the ninth formula is $$T = \left\lceil \alpha \times \sum_{l=l_0}^{N_{symb,slotoverlap}^{PUSCH}-1} M_{SC}^{UCI}(l) \right\rceil$$

the tenth formula is $$T = \left\lceil \alpha \times \sum_{l=l_0}^{N_{symb,total}^{PUSCH}-1} M_{SC}^{UCI}(l) \right\rceil$$

the eleventh formula is $$T = \left\lceil \sum_{l=l_0}^{N_{symb,slotoverlap}^{PUSCH}-1} M_{SC}^{UCI}(l) \right\rceil$$

where T is the upper limit of resources used for UCI multiplexing on the PUSCH, $\alpha$ is a coefficient for upper limit of resources, $N_{symb,\ slotoverlap}^{PUSCH}$ is the number of OFDM symbols of the PUSCH in at least one slot where the PUSCH transmission overlaps with the PUCCH, $l_0$ is an OFDM symbol index where the UCI mapping starts among the symbols of the PUSCH, $M_{SC}^{UCI}(\ )$ is the number of SCs that can be used for UCI transmission in OFDM symbol l, $N_{symb,\ total}^{PUSCH}$ is the total number of OFDM symbols of the PUSCH.

In an embodiment, the determining the upper limit of resources used for UCI multiplexing on the PUSCH based on the number of symbols of actual PUSCH overlapping with the PUCCH includes:

determining the upper limit of resources used for UCI multiplexing on the PUSCH based on a twelfth formula; or determining a smaller value of a value obtained by a thirteenth formula and a value obtained by a fourteenth formula to be the upper limit of resources used for UCI multiplexing on the PUSCH;

the twelfth formula is $$T = \left| \alpha \times \sum_{l=l_0}^{N_{symb,actual}^{PUSCH}-1} M_{SC}^{UCI}(l) \right|$$

the thirteenth formula is $$T = \left| \alpha \times \sum_{l=l_0}^{N_{symb,total}^{PUSCH}-1} M_{SC}^{UCI}(l) \right|$$

the fourteenth formula is $$T = \left| \sum_{l=l_0}^{N_{symb,actual}^{PUSCH}-1} M_{SC}^{UCI}(l) \right|$$

where T is the upper limit of resources used for UCI multiplexing on the PUSCH, α is a coefficient for upper limit of resources, $N_{symb,\,total}^{PUSCH}$ total is the total number of OFDM symbols of the PUSCH, $l_0$ is an OFDM symbol index where the UCI mapping starts among the symbols of the PUSCH, $M_{SC}^{UCI}(l)$ is the number of SCs that can be used for UCI transmission in OFDM symbol l, $N_{symb,\,actual}^{PUSCH}$ is the number of OFDM symbols of at least one segmented PUSCH that overlaps with the PUCCH in case that the PUSCH is segmented for transmission.

In an embodiment, after determining the upper limit of resources used for UCI multiplexing on the PUSCH, further including:

in case that a first UCI and a second UCI other than the UCI are multiplexed on the PUSCH, obtaining an upper limit of resources used for first UCI multiplexing on the PUSCH by subtracting resources used for the actual UCI transmission from the upper limit of resources used for UCI multiplexing on the PUSCH; and obtaining an upper limit of resources used for second UCI multiplexing on the PUSCH by subtracting resources used for the actual UCI transmission and actual first UCI transmission from the upper limit of resources used for UCI multiplexing on the PUSCH.

In an embodiment, the determining the resources used for actual UCI transmission based on the resources required for UCI multiplexing on the PUSCH and the upper limit of resources used for UCI multiplexing on the PUSCH includes:

determining a smaller value between the resources required for UCI multiplexing on the PUSCH and the upper limit of resources used for UCI multiplexing on the PUSCH to be the resources used for actual UCI transmission.

It should be noted that, the division of units/modules in the embodiments of the present application is schematic, and is only a logical function division, and there may be other division manners in actual implementation. In an embodiment, the functional units in the various embodiments of the present application may be integrated into one processing unit, or each unit may exist alone physically, or two or more units may be integrated into one unit. The aforementioned integrated unit may be implemented in the form of hardware or software functional unit.

In the case that the integrated unit is implemented in the form of a software functional unit and sold or used as an independent product, it may be stored in a processor readable storage medium. Based on such understanding, the solutions of the present application in essence or a part of the solutions that contributes to the related art, or all or part of the solutions, may be embodied in the form of a software product, which is stored in a storage medium, including several instructions to cause a computer device (which may be a personal computer, server, or network device, etc.) or a processor to perform all or part of the steps of the methods described in the respective embodiments of the present application. The storage medium described above includes various media that can store program codes, such as USB flash disk, mobile hard disk, read-only memory (ROM), random access memory (RAM), magnetic disk, or optical disk.

It should be noted that, the apparatus in the embodiments of the application can implement all the methods provided by the above method embodiments and achieve the same technical effects. The same parts and beneficial effects as the method embodiments are not repeated.

In some embodiments, it also provides a non-transitory processor readable storage medium storing computer programs that cause a processor to perform the methods in the above embodiments.

The processor readable storage medium may be any available medium or data storage device that may be accessed by the processor, including but not limited to, a magnetic storage (e.g., a floppy disk, a hard disk, a magnetic tape, a magneto-optical disk (MO), etc.), optical memory (such as CD, DVD, BD, HVD, etc.), and a semiconductor memory (such as ROM, EPROM, EEPROM, non-volatile memory (NAND FLASH), solid-state drive (SSD)), etc According to the embodiment, the processor readable medium stores a computer program, and the computer program is used for causing the processor to perform the uplink control information (UCI) multiplexing method.

As will be appreciated by those skilled in the art, embodiments of the present application may be provided as a method, system, or computer program product. Accordingly, the present application may take the form of an entirely hardware embodiment, an entirely software embodiment, or an embodiment combining software and hardware aspects. Furthermore, the present application may take the form of a computer program product embodied on one or more computer-usable storage media having computer-usable program code embodied therein, including but not limited to disk storage, optical storage, and the like.

The present application is described with reference to flow charts and/or block diagrams of methods, apparatus (systems), and computer program products according to embodiments of the present application. It will be understood that each flow and/or block in the flow charts and/or block diagrams, and combinations thereof may be implemented by computer-executable instructions. These computer-executable instructions may be provided to processors of a general-purpose computer, a special purpose computer, an embedded processor or other programmable data processing device to produce a machine and the instructions executed by the processor of the computer or other programmable data processing device form a means for performing the functions specified in one or more flows in a flowchart and/or one or more blocks of a block diagram.

These processor executable instructions may be stored in processor-readable memory capable of directing a computer or other programmable data processing apparatus to operate in a particular manner, and the instructions stored in the processor-readable memory may result in a manufacture including instruction means, the instruction means may perform the functions specified in one or more flows of the flowchart and/or one or more blocks of the block diagram.

These processor executable instructions may also be loaded onto a computer or other programmable data processing device to cause a series of operational steps to be performed on the computer or other programmable device to produce a computer-implemented process and instructions performed on the computer or other programmable devices provide steps for performing the functions specified in one or more flows of the flowchart and/or one or more blocks of the block diagram.

It is apparent to those skilled in the art that various modifications and variations may be made in the present application without departing from the scope of the present application. Thus, provided that these modifications and variations of the present application are within the scope of the claims of the present application and their equivalents, the present application is also intended to cover such modifications and variations.

What is claimed is:

1. An uplink control information (UCI) multiplexing method, performed by a terminal, wherein for a physical uplink shared channel (PUSCH) carrying a multi-slot transport block (TB), in case that the PUSCH and a physical uplink control channel (PUCCH) overlap in at least one slot, the UCI multiplexing method comprising:
   determining resources required for UCI multiplexing on the PUSCH and an upper limit of resources used for UCI multiplexing on the PUSCH;
   determining resources used for actual UCI transmission based on the resources required for UCI multiplexing on the PUSCH and the upper limit of resources used for UCI multiplexing on the PUSCH; and
   transmitting the UCI on the PUSCH based on the resources used for the actual UCI transmission,
   wherein the determining the resources required for UCI multiplexing on the PUSCH comprises any one of the followings: determining the resources required for UCI multiplexing on the PUSCH based on resources for the PUSCH in one slot; or determining the resources required for UCI multiplexing on the PUSCH based on resources for the PUSCH in a nominal transmission,
   wherein determining the resources required for UCI multiplexing on the PUSCH based on resources for the PUSCH in one slot comprises: determining the resources required for UCI multiplexing on the PUSCH based on resources for the PUSCH in a first slot or a last slot; or, determining the resources required for UCI multiplexing on the PUSCH based on resources in a slot with a maximum or a minimum number of orthogonal frequency division multiplexing (OFDM) symbols among multiple slots corresponding to PUSCH transmission,
   wherein determining the resources required for UCI multiplexing on the PUSCH based on resources for the PUSCH in the nominal transmission comprises: determining the resources required for UCI multiplexing on the PUSCH based on a number of OFDM symbols of the PUSCH in a nominal transmission without segmentation, wherein the nominal transmission is determined based on scheduling downlink control information (DCI) or configuration information,
   wherein in case of determining the resources required for UCI multiplexing on the PUSCH based on the number of OFDM symbols of the PUSCH in one slot, determining the resources required for UCI multiplexing on the PUSCH based on a first formula or a second formula;
   the first formula is $$R = \left\lceil (O_{UCI} + L_{UCI}) \times \beta_{offset}^{PUSCH} \times \frac{\sum_{l=0}^{N_{symb,slot}^{PUSCH}-1} M_{SC}^{UCI}(l)}{\sum_{r=0}^{C_{UCI-SCH}-1} K_r} \right\rceil$$

the second formula is $$R = \left\lceil (O_{UCI} + L_{UCI}) \times \beta_{offset}^{PUSCH} \times \frac{\sum_{l=0}^{N_{symb,slot}^{PUSCH}-1} M_{SC}^{UCI}(l)}{\sum_{r=0}^{C_{UCI-SCH}-1} K_r/N} \right\rceil$$

wherein R is the resources required for UCI multiplexing on the PUSCH, $O_{UCI}$ is the number of bits for UCI carried on the PUSCH, $L_{UCI}$ is the number of cyclic redundancy check (CRC) bits for the UCI, $\beta_{offset}^{PUSCH}$ is a beta offset between data and the UCI, $N_{symb,slot}^{PUSCH}$ is the number of OFDM symbols of the PUSCH in a first slot or is the maximum or minimum number of OFDM symbols in all the slots for PUSCH transmission, $M_{SC}^{UCI}(l)$ is the number of sub-carriers (SC) used for UCI transmission in OFDM symbol l, $C_{UCI-SCH}$ is the number of code blocks for uplink shared channel (UL-SCH) of the PUSCH transmission, $K_r$ is the r-th code block size for UL-SCH of the PUSCH transmission, N is the number of slots used for the PUSCH transmission.

2. The method of claim 1, wherein
in case of determining the resources required for UCI multiplexing on the PUSCH based on the number of OFDM symbols of the PUSCH in a nominal transmission without segmentation,
determining the resources required for UCI multiplexing on the PUSCH based on a third formula or a fourth formula;
the third formula is $$R = \left\lceil (O_{UCI} + L_{UCI}) \times \beta_{offset}^{PUSCH} \times \frac{\sum_{l=0}^{N_{symb,nominal}^{PUSCH}-1} M_{SC}^{UCI}(l)}{\sum_{r=0}^{C_{UCI-SCH}-1} K_r} \right\rceil$$

the fourth formula is $$R = \left\lceil (O_{UCI} + L_{UCI}) \times \beta_{offset}^{PUSCH} \times \frac{\sum_{l=0}^{N_{symb,nominal}^{PUSCH}-1} M_{SC}^{UCI}(l)}{\sum_{r=0}^{C_{UCI-SCH}-1} K_r/M} \right\rceil$$

wherein R is the resources required for UCI multiplexing on the PUSCH, $O_{UCI}$ is the number of bits for UCI carried on the PUSCH, $L_{UCI}$ is the number of CRC bits for the UCI, $\beta_{offset}^{PUSCH}$ is a beta offset between data and the UCI, $N_{symb,nominal}^{PUSCH}$ is the number of OFDM symbols of the PUSCH in a nominal transmission, $M_{SC}^{UCI}(l)$ is the number of SCs used for UCI transmission in OFDM symbol l, $C_{UCI-SCH}$ is the number of code blocks for UL-SCH of the PUSCH transmission, $K_r$ is the r-th code block size for UL-SCH of the PUSCH transmission, M is the number of nominal transmissions used for the PUSCH transmission.

3. The method of claim 1, wherein the determining the upper limit of resources used for UCI multiplexing on the PUSCH comprises: determining the upper limit of resources used for UCI multiplexing on the PUSCH based on resources for PUSCH overlapping with the PUCCH;
wherein the determining the upper limit of resources used for UCI multiplexing on the PUSCH based on resources for PUSCH overlapping with the PUCCH comprises any one of the followings:
determining the upper limit of resources used for UCI multiplexing on the PUSCH based on the number of OFDM symbols overlapping with the PUCCH;
determining the upper limit of resources used for UCI multiplexing on the PUSCH based on the number of OFDM symbols of the PUSCH in a slot where the PUCCH and the PUSCH overlap; and
in case that the PUSCH is segmented in a slot, determining the upper limit of resources used for UCI multiplexing on the PUSCH based on the number of symbols of actual PUSCH overlapping with the PUCCH.

4. The method of claim 3, wherein the determining the upper limit of resources used for UCI multiplexing on the PUSCH based on the number of OFDM symbols overlapping with the PUCCH comprises:
determining the upper limit of resources used for UCI multiplexing on the PUSCH based on a sixth formula; or
determining a smaller value of a value obtained by a seventh formula and a value obtained by an eighth formula to be the upper limit of resources used for UCI multiplexing on the PUSCH;
the sixth formula is $$T = \left\lceil \alpha \times \sum_{l=l_0}^{N_{symb,overlap}^{PUSCH}-1} M_{SC}^{UCI}(l) \right\rceil$$

the seventh formula is $$T = \left\lceil \alpha \times \sum_{l=l_0}^{N_{symb,total}^{PUSCH}-1} M_{SC}^{UCI}(l) \right\rceil$$

the eighth formula is $$T = \left\lceil \sum_{l=l_0}^{N_{symb,overlap}^{PUSCH}-1} M_{SC}^{UCI}(l) \right\rceil$$

wherein T is the upper limit of resources used for UCI multiplexing on the PUSCH, $\alpha$ is a coefficient for upper limit of resources, $N_{symb, overlap}^{PUSCH}$ is the number of symbols that conflict with the PUCCH among the symbols of the PUSCH, $l_0$ is an OFDM symbol index of a symbol where the UCI mapping starts among the symbols of the PUSCH, $M_{SC}^{UCI}(l)$ is the number of SCs used for UCI transmission in OFDM symbol l, $N_{symb, total}^{PUSCH}$ is the total number of OFDM symbols of the PUSCH.

5. The method of claim 3, wherein the determining the upper limit of resources used for UCI multiplexing on the PUSCH based on the number of OFDM symbols of the PUSCH in the slot where the PUCCH and the PUSCH overlap comprises:
determining the upper limit of resources used for UCI multiplexing on the PUSCH based on a ninth formula; or
determining a smaller value of a value obtained by a tenth formula and a value obtained by an eleventh formula to be the upper limit of resources used for UCI multiplexing on the PUSCH;
the ninth formula is $$T = \left\lceil \alpha \times \sum_{l=l_0}^{N_{symb,slotoverlap}^{PUSCH}-1} M_{SC}^{UCI}(l) \right\rceil$$

the tenth formula is $$T = \left\lceil \alpha \times \sum_{l=l_0}^{N_{symb,total}^{PUSCH}-1} M_{SC}^{UCI}(l) \right\rceil$$

the eleventh formula is $$T = \left\lceil \sum_{l=l_0}^{N_{symb,slotoverlap}^{PUSCH}-1} M_{SC}^{UCI}(l) \right\rceil$$

wherein T is the upper limit of resources used for UCI multiplexing on the PUSCH, $\alpha$ is a coefficient for upper limit of resources, $N_{symb, slotoverlap}^{PUSCH}$ is the number of OFDM symbols of the PUCCH in at least one slot where the PUSCH transmission overlaps with the PUCCH, $l_0$ is an OFDM symbol index where the UCI mapping starts among the symbols of the PUSCH, $M_{SC}^{UCI}(l)$ is the number of SCs used for UCI transmission in OFDM symbol l, $N_{symb, total}^{PUSCH}$ is the total number of OFDM symbols of the PUSCH.

6. The method of claim 3, wherein the determining the upper limit of resources used for UCI multiplexing on the PUSCH based on the number of symbols of actual PUSCH overlapping with the PUCCH comprises:
determining the upper limit of resources used for UCI multiplexing on the PUSCH based on a twelfth formula; or
determining a smaller value of a value obtained by a thirteenth formula and a value obtained by a fourteenth formula to be the upper limit of resources used for UCI multiplexing on the PUSCH;
the twelfth formula is $$T = \left\lceil \alpha \times \sum_{l=l_0}^{N_{symb,actual}^{PUSCH}-1} M_{SC}^{UCI}(l) \right\rceil$$

the thirteenth formula is $$T = \left\lceil \alpha \times \sum_{l=l_0}^{N_{symb,total}^{PUSCH}-1} M_{SC}^{UCI}(l) \right\rceil$$

the fourteenth formula is $$T = \left\lceil \sum_{l=l_0}^{N_{symb,actual}^{PUSCH}-1} M_{SC}^{UCI}(l) \right\rceil$$

wherein T is the upper limit of resources used for UCI multiplexing on the PUSCH, $\alpha$ is a coefficient for upper limit of resources, $N_{symb,\,total}^{PUSCH}$ is the total number of OFDM symbols of the PUSCH, $l_0$ is an OFDM symbol index where the UCI mapping starts among the symbols of the PUSCH, $M_{SC}^{UCI}(l)$ is the number of SCs used for UCI transmission in OFDM symbol l, $N_{symb,\,actual}^{PUSCH}$ is the number of OFDM symbols of at least one segmented PUSCH that overlaps with the PUCCH in case that the PUSCH is segmented for transmission.

7. The method of claim 1, after determining the upper limit of resources used for UCI multiplexing on the PUSCH, further comprising:
   in case that a first UCI and a second UCI other than the UCI are multiplexed on the PUSCH, obtaining an upper limit of resources used for first UCI multiplexing on the PUSCH by subtracting resources used for the actual UCI transmission from the upper limit of resources used for UCI multiplexing on the PUSCH; and
   obtaining an upper limit of resources used for second UCI multiplexing on the PUSCH by subtracting resources used for the actual UCI transmission and actual first UCI transmission from the upper limit of resources used for UCI multiplexing on the PUSCH.

8. The method of claim 1, wherein the determining the resources used for actual UCI transmission based on the resources required for UCI multiplexing on the PUSCH and the upper limit of resources used for UCI multiplexing on the PUSCH comprises:
   determining a smaller value between the resources required for UCI multiplexing on the PUSCH and the upper limit of resources used for UCI multiplexing on the PUSCH to be the resources used for actual UCI transmission.

9. An uplink control information (UCI) multiplexing method, performed by a network side device, wherein for a physical uplink shared channel (PUSCH) carrying a multi-slot transport block (TB), in case that the PUSCH and a physical uplink control channel (PUCCH) overlap in at least one slot, the UCI multiplexing method comprising:
   determining resources required for UCI multiplexing on the PUSCH and an upper limit of resources used for UCI multiplexing on the PUSCH;
   determining resources used for actual UCI transmission based on the resources required for UCI multiplexing on the PUSCH and the upper limit of resources used for UCI multiplexing on the PUSCH; and
   receiving the UCI on the PUSCH based on the resources used for the actual UCI transmission, wherein the determining the resources required for UCI multiplexing on the PUSCH comprises any one of the followings: determining the resources required for UCI multiplexing on the PUSCH based on resources for the PUSCH in one slot; or determining the resources required for UCI multiplexing on the PUSCH based on resources for the PUSCH in a nominal transmission, wherein determining the resources required for UCI multiplexing on the PUSCH based on resources for the PUSCH in one slot comprises: determining the resources required for UCI multiplexing on the PUSCH based on resources for the PUSCH in a first slot or a last slot; or, determining the resources required for UCI multiplexing on the PUSCH based on resources in a slot with a maximum or a minimum number of orthogonal frequency division multiplexing (OFDM) symbols among multiple slots corresponding to PUSCH transmission, wherein determining the resources required for UCI multiplexing on the PUSCH based on resources for the PUSCH in the nominal transmission comprises: determining the resources required for UCI multiplexing on the PUSCH based on a number of OFDM symbols of the PUSCH in a nominal transmission without segmentation, wherein the nominal transmission is determined based on scheduling downlink control information (DCI) or configuration information, wherein in case of determining the resources required for UCI multiplexing on the PUSCH based on the number of OFDM symbols of the PUSCH in one slot, determining the resources required for UCI multiplexing on the PUSCH based on a first formula or a second formula;

the first formula is $$R = \left\lceil (O_{UCI} + L_{UCI}) \times \beta_{offset}^{PUSCH} \times \sum_{l=0}^{N_{symb,slot}^{PUSCH}-1} M_{SC}^{UCI}(l) \Big/ \sum_{r=0}^{C_{UCI-SCH}-1} K_r \right\rceil$$

the second formula is $$R = \left\lceil (O_{UCI} + L_{UCI}) \times \beta_{offset}^{PUSCH} \times \sum_{l=0}^{N_{symb,slot}^{PUSCH}-1} M_{SC}^{UCI}(l) \Big/ \sum_{r=0}^{C_{UCI-SCH}-1} K_r / N \right\rceil$$

wherein R is the resources required for UCI multiplexing on the PUSCH, $O_{UCI}$ is the number of bits for UCI carried on the PUSCH, $L_{UCI}$ is the number of cyclic redundancy check (CRC) bits for the UCI, $\beta_{offset}^{PUSCH}$ is a beta offset between data and the UCI, $N_{symb,\,slot}^{PUSCH}$ is the number of OFDM symbols of the PUSCH in a first slot or is the maximum or minimum number of OFDM symbols in all the slots for PUSCH transmission, $M_{SC}^{UCI}(l)$ is the number of sub-carriers (SC) used for UCI transmission in OFDM symbol l, $C_{UCI-SCH}$ is the number of code blocks for uplink shared channel (UL-SCH) of the PUSCH transmission, $K_r$ is the r-th code block size for UL-SCH of the PUSCH transmission, N is the number of slots used for the PUSCH transmission.

10. The method of claim 9, wherein in case of determining the resources required for UCI multiplexing on the PUSCH based on the number of OFDM symbols of the PUSCH in a nominal transmission without segmentation, determining the resources required for UCI multiplexing on the PUSCH based on a third formula or a fourth formula;

the third formula is $$R = \left\lceil (O_{UCI} + L_{UCI}) \times \beta_{offset}^{PUSCH} \times \frac{\sum_{l=0}^{N_{symb,nominal}^{PUSCH}-1} M_{SC}^{UCI}(l)}{\sum_{r=0}^{C_{UCI-SCH}-1} K_r} \right\rceil$$

the fourth formula is $$R = \left\lceil (O_{UCI} + L_{UCI}) \times \beta_{offset}^{PUSCH} \times \frac{\sum_{l=0}^{N_{symb,nominal}^{PUSCH}-1} M_{SC}^{UCI}(l)}{\sum_{r=0}^{C_{UCI-SCH}-1} K_r / M} \right\rceil$$

where R is the resources required for UCI multiplexing on the PUSCH, $O_{UCI}$ is the number of bits for UCI carried on the PUSCH, $L_{UCI}$ is the number of CRC bits for the UCI, $\beta_{offset}^{PUSCH}$ is a beta offset between data and the UCI, $N_{symb,\ nominal}^{PUSCH}$ is the number of OFDM symbols of the PUSCH in a nominal transmission, $M_{SC}^{UCI}(l)$ is the number of SCs used for UCI transmission in OFDM symbol l, $C_{UCI-SCH}$ is the number of code blocks for UL-SCH of the PUSCH transmission, $K_r$ is the r-th code block size for UL-SCH of the PUSCH transmission, M is the number of nominal transmissions used for the PUSCH transmission.

11. The method of claim 9, wherein the determining the upper limit of resources used for UCI multiplexing on the PUSCH comprises: determining the upper limit of resources used for UCI multiplexing on the PUSCH based on resources for PUSCH overlapping with the PUCCH;

wherein the determining the upper limit of resources used for UCI multiplexing on the PUSCH based on resources for PUSCH overlapping with the PUCCH comprises any one of the followings:

determining the upper limit of resources used for UCI multiplexing on the PUSCH based on the number of OFDM symbols overlapping with the PUCCH;

determining the upper limit of resources used for UCI multiplexing on the PUSCH based on the number of OFDM symbols of the PUSCH in a slot where the PUCCH and the PUSCH overlap; and in case that the PUSCH is segmented in a slot, determining the upper limit of resources used for UCI multiplexing on the PUSCH based on the number of symbols of actual PUSCH overlapping with the PUCCH.

12. The method of claim 11, wherein the determining the upper limit of resources used for UCI multiplexing on the PUSCH based on the number of OFDM symbols overlapping with the PUCCH comprises:

determining the upper limit of resources used for UCI multiplexing on the PUSCH based on a sixth formula; or determining a smaller value of a value obtained by a seventh formula and a value obtained by an eighth formula to be the upper limit of resources used for UCI multiplexing on the PUSCH;

the sixth formula is $$T = \left\lceil \alpha \times \sum_{l=l_0}^{N_{symb,overlap}^{PUSCH}-1} M_{SC}^{UCI}(l) \right\rceil$$

the seventh formula is $$T = \left\lceil \alpha \times \sum_{l=l_0}^{N_{symb,total}^{PUSCH}-1} M_{SC}^{UCI}(l) \right\rceil$$

the eighth formula is $$T = \left\lceil \sum_{l=l_0}^{N_{symb,overlap}^{PUSCH}-1} M_{SC}^{UCI}(l) \right\rceil$$

wherein T is the upper limit of resources used for UCI multiplexing on the PUSCH, $\alpha$ is a coefficient for upper limit of resources, $N_{symb,\ overlap}^{PUSCH}$ is the number of symbols that conflict with the PUCCH among the symbols of the PUSCH, $l_0$ is an OFDM symbol index of a symbol where the UCI mapping starts among the symbols of the PUSCH, $M_{SC}^{UCI}(l)$ is the number of SCs used for UCI transmission in OFDM symbol l, $N_{symb,\ total}^{PUSCH}$ is the total number of OFDM symbols of the PUSCH.

13. The method of claim 11, wherein the determining the upper limit of resources used for UCI multiplexing on the PUSCH based on the number of OFDM symbols of the PUSCH in the slot where the PUCCH and the PUSCH overlap comprises:

determining the upper limit of resources used for UCI multiplexing on the PUSCH based on a ninth formula; or determining a smaller value of a value obtained by a tenth formula and a value obtained by an eleventh formula to be the upper limit of resources used for UCI multiplexing on the PUSCH;

the ninth formula is $$T = \left\lceil \alpha \times \sum_{l=l_0}^{N_{symb,slotoverlap}^{PUSCH}-1} M_{SC}^{UCI}(l) \right\rceil$$

the tenth formula is $$T = \left\lceil \alpha \times \sum_{l=l_0}^{N_{symb,total}^{PUSCH}-1} M_{SC}^{UCI}(l) \right\rceil$$

the eleventh formula is $$T = \left\lceil \sum_{l=l_0}^{N^{PUSCH}_{symb,slotoverlap}-1} M^{UCI}_{SC}(l) \right\rceil$$

wherein T is the upper limit of resources used for UCI multiplexing on the PUSCH, α is a coefficient for upper limit of resources, $N^{PUSCH}_{symb, slotoverlap}$ is the number of OFDM symbols of the PUSCH in at least one slot where the PUSCH transmission overlaps with the PUCCH, $l_0$ is an OFDM symbol index where the UCI mapping starts among the symbols of the PUSCH, $M_{SC}^{UCI}(l)$ is the number of SCs used for UCI transmission in OFDM symbol l, $N^{PUSCH}_{symb, total}$ is the total number of OFDM symbols of the PUSCH.

14. The method of claim 11, wherein the determining the upper limit of resources used for UCI multiplexing on the PUSCH based on the number of symbols of actual PUSCH overlapping with the PUCCH comprises:
  determining the upper limit of resources used for UCI multiplexing on the PUSCH based on a twelfth formula; or
  determining a smaller value of a value obtained by a thirteenth formula and a value obtained by a fourteenth formula to be the upper limit of resources used for UCI multiplexing on the PUSCH;
the twelfth formula is $$T = \left\lceil \alpha \times \sum_{l=l_0}^{N^{PUSCH}_{symb,total}-1} M^{UCI}_{SC}(l) \right\rceil$$

the thirteenth formula is $$T = \left\lceil \alpha \times \sum_{l=l_0}^{N^{PUSCH}_{symb,total}-1} M^{UCI}_{SC}(l) \right\rceil$$

the fourteenth formula is $$T = \left\lceil \sum_{l=l_0}^{N^{PUSCH}_{symb,actual}-1} M^{UCI}_{SC}(l) \right\rceil$$

wherein T is the upper limit of resources used for UCI multiplexing on the PUSCH, α is a coefficient for upper limit of resources, $N^{PUSCH}_{symb, total}$ is the total number of OFDM symbols of the PUSCH, $l_0$ is an OFDM symbol index where the UCI mapping starts among the symbols of the PUSCH, $M_{SC}^{UCI}(l)$ is the number of SCs used for UCI transmission in OFDM symbol l, $N^{PUSCH}_{symb, actual}$ is the number of OFDM symbols of at least one segmented PUSCH that overlaps with the PUCCH in case that the PUSCH is segmented for transmission.

15. The method of claim 9, after determining the upper limit of resources used for UCI multiplexing on the PUSCH, further comprising:

in case that a first UCI and a second UCI other than the UCI are multiplexed on the PUSCH, obtaining an upper limit of resources used for first UCI multiplexing on the PUSCH by subtracting resources used for the actual UCI transmission from the upper limit of resources used for UCI multiplexing on the PUSCH; and obtaining an upper limit of resources used for second UCI multiplexing on the PUSCH by subtracting resources used for the actual UCI transmission and actual first UCI transmission from the upper limit of resources used for UCI multiplexing on the PUSCH.

16. The method of claim 9, wherein the determining the resources used for actual UCI transmission based on the resources required for UCI multiplexing on the PUSCH and the upper limit of resources used for UCI multiplexing on the PUSCH comprises:
  determining a smaller value between the resources required for UCI multiplexing on the PUSCH and the upper limit of resources used for UCI multiplexing on the PUSCH to be the resources used for actual UCI transmission.

17. A terminal, comprising:
  a processor, a memory storing a computer program, and a transceiver transmitting and receiving data under a control of the processor,
  wherein the computer program, when executed by the processor, causes the terminal to perform the following operations of:
  for a physical uplink shared channel (PUSCH) carrying a multi-slot transport block (TB), in case that the PUSCH and a physical uplink control channel (PUCCH) overlap in at least one slot, determining resources required for UCI multiplexing on the PUSCH and an upper limit of resources used for UCI multiplexing on the PUSCH;
  determining resources used for actual UCI transmission based on the resources required for UCI multiplexing on the PUSCH and the upper limit of resources used for UCI multiplexing on the PUSCH; and
  transmitting the UCI on the PUSCH based on the resources used for the actual UCI transmission,
  wherein the determining the resources required for UCI multiplexing on the PUSCH comprises any one of the followings: determining the resources required for UCI multiplexing on the PUSCH based on resources for the PUSCH in one slot; or determining the resources required for UCI multiplexing on the PUSCH based on resources for the PUSCH in a nominal transmission,
  wherein determining the resources required for UCI multiplexing on the PUSCH based on resources for the PUSCH in one slot comprises: determining the resources required for UCI multiplexing on the PUSCH based on resources for the PUSCH in a first slot or a last slot; or, determining the resources required for UCI multiplexing on the PUSCH based on resources in a slot with a maximum or a minimum number of orthogonal frequency division multiplexing (OFDM) symbols among multiple slots corresponding to PUSCH transmission,
  wherein determining the resources required for UCI multiplexing on the PUSCH based on resources for the PUSCH in the nominal transmission comprises: determining the resources required for UCI multiplexing on the PUSCH based on a number of OFDM symbols of the PUSCH in a nominal transmission without segmentation, wherein the nominal transmission is determined based on scheduling downlink control information (DCI) or configuration information, wherein in case of determining the resources required for UCI multiplexing on the PUSCH based on the number of OFDM symbols of the PUSCH in one slot, determining the resources required for UCI multiplexing on the PUSCH based on a first formula or a second formula;

the first formula is $$R = \left\lceil (O_{UCI} + L_{UCI}) \times \beta_{offset}^{PUSCH} \times \frac{\sum_{l=0}^{N_{symb,slot}^{PUSCH}-1} M_{SC}^{UCI}(l)}{\sum_{r=0}^{C_{UCI-SCH}-1} K_r} \right\rceil$$

the second formula is $$R = \left\lceil (O_{UCI} + L_{UCI}) \times \beta_{offset}^{PUSCH} \times \frac{\sum_{l=0}^{N_{symb,slot}^{PUSCH}-1} M_{SC}^{UCI}(l)}{\sum_{r=0}^{C_{UCI-SCH}-1} K_r/N} \right\rceil$$

wherein R is the resources required for UCI multiplexing on the PUSCH, $O_{UCI}$ is the number of bits for UCI carried on the PUSCH, $L_{UCI}$ is the number of cyclic redundancy check (CRC) bits for the UCI, $\beta_{offset}^{PUSCH}$ is a beta offset between data and the UCI, $N_{symb,slot}^{PUSCH}$ is the number of OFDM symbols of the PUSCH in a first slot or is the maximum or minimum number of OFDM symbols in all the slots for PUSCH transmission, $M_{SC}^{UCI}(l)$ is the number of sub-carriers (SC) used for UCI transmission in OFDM symbol l, $C_{UCI-SCH}$ is the number of code blocks for uplink shared channel (UL-SCH) of the PUSCH transmission, $K_r$ is the r-th code block size for UL-SCH of the PUSCH transmission, N is the number of slots used for the PUSCH transmission.

18. The terminal of claim 17, wherein the determining the upper limit of resources used for UCI multiplexing on the PUSCH comprises: determining the upper limit of resources used for UCI multiplexing on the PUSCH based on resources for PUSCH overlapping with the PUCCH;
wherein the determining the upper limit of resources used for UCI multiplexing on the PUSCH based on resources for PUSCH overlapping with the PUCCH comprises any one of the followings:
determining the upper limit of resources used for UCI multiplexing on the PUSCH based on the number of OFDM symbols overlapping with the PUCCH;
determining the upper limit of resources used for UCI multiplexing on the PUSCH based on the number of OFDM symbols of the PUSCH in a slot where the PUCCH and the PUSCH overlap; and
in case that the PUSCH is segmented in a slot, determining the upper limit of resources used for UCI multiplexing on the PUSCH based on the number of symbols of actual PUSCH overlapping with the PUCCH.

19. A network side device, comprising:
a processor,
a memory storing a computer program, and
a transceiver transmitting and receiving data under a control of the processor,
wherein the computer program, when executed by the processor, causes the network side device to perform the following operations of:
for a physical uplink shared channel (PUSCH) carrying a multi-slot transport block (TB), in case that the PUSCH and a physical uplink control channel (PUCCH) overlap in at least one slot, determining resources required for UCI multiplexing on the PUSCH and an upper limit of resources used for UCI multiplexing on the PUSCH;
determining resources used for actual UCI transmission based on the resources required for UCI multiplexing on the PUSCH and the upper limit of resources used for UCI multiplexing on the PUSCH; and
receiving the UCI on the PUSCH based on the resources used for the actual UCI transmission,
wherein the determining the resources required for UCI multiplexing on the PUSCH comprises any one of the followings: determining the resources required for UCI multiplexing on the PUSCH based on resources for the PUSCH in one slot; or determining the resources required for UCI multiplexing on the PUSCH based on resources for the PUSCH in a nominal transmission,
wherein determining the resources required for UCI multiplexing on the PUSCH based on resources for the PUSCH in one slot comprises: determining the resources required for UCI multiplexing on the PUSCH based on resources for the PUSCH in a first slot or a last slot; or, determining the resources required for UCI multiplexing on the PUSCH based on resources in a slot with a maximum or a minimum number of orthogonal frequency division multiplexing (OFDM) symbols among multiple slots corresponding to PUSCH transmission,
wherein determining the resources required for UCI multiplexing on the PUSCH based on resources for the PUSCH in the nominal transmission comprises: determining the resources required for UCI multiplexing on the PUSCH based on a number of OFDM symbols of the PUSCH in a nominal transmission without segmentation, wherein the nominal transmission is determined based on scheduling downlink control information (DCI) or configuration information,
wherein in case of determining the resources required for UCI multiplexing on the PUSCH based on the number of OFDM symbols of the PUSCH in one slot, determining the resources required for UCI multiplexing on the PUSCH based on a first formula or a second formula;
the first formula is $$R = \left\lceil (O_{UCI} + L_{UCI}) \times \beta_{offset}^{PUSCH} \times \frac{\sum_{l=0}^{N_{symb,slot}^{PUSCH}-1} M_{SC}^{UCI}(l)}{\sum_{r=0}^{C_{UCI-SCH}-1} K_r} \right\rceil$$

the second formula is $$R = \left\lceil (O_{UCI} + L_{UCI}) \times \beta_{offset}^{PUSCH} \times \frac{\sum_{l=0}^{N_{symb,slot}^{PUSCH}-1} M_{SC}^{UCI}(l)}{\sum_{r=0}^{C_{UCI-SCH}-1} K_r/N} \right\rceil$$

wherein R is the resources required for UCI multiplexing on the PUSCH, $O_{UCI}$ is the number of bits for UCI carried on the PUSCH, $L_{UCI}$ is the number of cyclic redundancy check (CRC) bits for the UCI, $\beta_{offset}^{PUSCH}$ is a beta offset between data and the UCI, $N_{symb,slot}^{PUSCH}$ is the number of OFDM symbols of the PUSCH in a first slot or is the maximum or minimum number of OFDM symbols in all the slots for PUSCH transmission, $M_{SC}^{UCI}(l)$ is the number of sub-carriers (SC) used for UCI transmission in OFDM symbol l, $C_{UCI-SCH}$ is the number of code blocks for uplink shared channel (UL-SCH) of the PUSCH transmission, $K_r$ is the r-th code block size for UL-SCH of the PUSCH transmission, N is the number of slots used for the PUSCH transmission.

20. The network side device of claim 19, wherein the determining the upper limit of resources used for UCI multiplexing on the PUSCH comprises: determining the upper limit of resources used for UCI multiplexing on the PUSCH based on resources for PUSCH overlapping with the PUCCH;

wherein the determining the upper limit of resources used for UCI multiplexing on the PUSCH based on resources for PUSCH overlapping with the PUCCH comprises any one of the followings:

determining the upper limit of resources used for UCI multiplexing on the PUSCH based on the number of OFDM symbols overlapping with the PUCCH;

determining the upper limit of resources used for UCI multiplexing on the PUSCH based on the number of OFDM symbols of the PUSCH in a slot where the PUCCH and the PUSCH overlap; and in case that the PUSCH is segmented in a slot, determining the upper limit of resources used for UCI multiplexing on the PUSCH based on the number of symbols of actual PUSCH overlapping with the PUCCH.

* * * * *